(12) United States Patent
Yue et al.

(10) Patent No.: US 11,990,756 B2
(45) Date of Patent: May 21, 2024

(54) LONG, SHORT AND MULTI-TIMESCALE VOLTAGE REGULATION METHOD BASED ON SOURCE-GRID-LOAD- STORAGE MULTI-TERMINAL COLLABORATION OF POWER DISTRIBUTION NETWORK

(71) Applicants: NANJING UNIVERSITY OF POSTS AND TELECOMMUNICATIONS, Jiangsu (CN); STATE GRID ELECTRIC POWER RESEARCH INSTITUTE CO. LTD, Jiangsu (CN)

(72) Inventors: Dong Yue, Jiangsu (CN); Chunxia Dou, Jiangsu (CN); Zhijun Zhang, Jiangsu (CN); Xiaohua Ding, Jiangsu (CN); Jianbo Luo, Jiangsu (CN); Yanman Li, Jiangsu (CN); Kun Huang, Jiangsu (CN); Tao Han, Jiangsu (CN)

(73) Assignees: NANJING UNIVERSITY OF POSTS AND TELECOMMUNICATIONS, Nanjing (CN); STATE GRID ELECTRIC POWER RESEARCH INSTITUTE CO. LTD, Nanjing (CN)

( * ) Notice: Subject to any disclaimer, the term of this patent is extended or adjusted under 35 U.S.C. 154(b) by 0 days.

(21) Appl. No.: 17/998,039

(22) PCT Filed: Jan. 5, 2022

(86) PCT No.: PCT/CN2022/070193
§ 371 (c)(1),
(2) Date: Jan. 26, 2023

(87) PCT Pub. No.: WO2023/000624
PCT Pub. Date: Jan. 26, 2023

(65) Prior Publication Data
US 2023/0387691 A1    Nov. 30, 2023

(30) Foreign Application Priority Data
Jul. 23, 2021    (CN) .......................... 202110833753.0

(51) Int. Cl.
*H02J 3/28*    (2006.01)

(52) U.S. Cl.
CPC .............. *H02J 3/28* (2013.01); *H02J 2203/20* (2020.01)

(58) Field of Classification Search
CPC ................................ H02J 3/28; H02J 2203/20
See application file for complete search history.

(56) References Cited

U.S. PATENT DOCUMENTS

| 2011/0133655 A1* | 6/2011 | Recker | .................. | H05B 47/13 |
| | | | | 315/159 |
| 2013/0345884 A1* | 12/2013 | Forbes, Jr. | ............ | H02J 3/0012 |
| | | | | 700/286 |

(Continued)

FOREIGN PATENT DOCUMENTS

CN    105140971 A    12/2015

OTHER PUBLICATIONS

Teng Shengqi, Hybrid Optimal Control Method for Micro-grid based on Multiagent Systems, China Excellent Master's Thesis Full text Database, Jan. 15, 2021, pp. 31-45.

(Continued)

*Primary Examiner* — Ziaul Karim
(74) *Attorney, Agent, or Firm* — Zhigang Ma

(57) ABSTRACT

A multi-timescale voltage regulation method based on source-grid-load-storage multi-terminal collaboration of a power distribution network is disclosed, which comprises: establishing, based on a Petri network, a multi-mode switching control model based on voltage security event trigger to realize effective control of a global voltage; establishing multi-objective optimization taking into account a source-storage-load regulation cost and a network transmission loss to realize collaborative and dynamic control of controllable resources of a source terminal, a load terminal and a storage terminal in each operating mode; and establishing a source-storage-load multi-terminal collaboration-based distributed voltage control model based on voltage security event trigger over a short timescale by taking into account the problems of voltage magnitude being out of limit and voltage leap, and solving online an optimal control sequence of the source terminal, the load terminal and the storage terminal in a receding horizon.

9 Claims, 8 Drawing Sheets

(56) References Cited

U.S. PATENT DOCUMENTS

2013/0345888 A1* 12/2013 Forbes, Jr. ............... H02J 3/32
700/291
2013/0346768 A1* 12/2013 Forbes, Jr. ............... H02J 3/48
713/310

OTHER PUBLICATIONS

CNIPA, Notification of a First Office Action for CN202110833753.0, dated Aug. 30, 2021.
Nanjing University of Posts and Telecommunications, State Grid Electric Power Research Institute Co., Ltd (Applicants), Reply to Notification of a First Office Action for CN202110833753.0, w/ (allowed) replacement claims, dated Aug. 31, 2021.
CNIPA, Notification to grant patent right for invention in CN202110833753.0, dated Sep. 7, 2021.

* cited by examiner

LONG, SHORT AND MULTI-TIMESCALE VOLTAGE REGULATION METHOD BASED ON SOURCE-GRID-LOAD- STORAGE MULTI-TERMINAL COLLABORATION OF POWER DISTRIBUTION NETWORK

FIELD

The invention belongs to the technical field of operation control of power distribution networks, and particularly relates to a long-timescale voltage regulation method based on source-grid-load-storage multi-terminal collaboration of a power distribution network, a short-timescale voltage regulation method based on source-grid-load-storage multi-terminal collaboration of a power distribution network, and a multi-timescale voltage regulation method based on source-grid-load-storage multi-terminal collaboration of a power distribution network.

BACKGROUD

The active power distribution network (abbreviated as power distribution network), as a main basic platform serving the nation to realize the purposes of "carbon dioxide peaking" and "carbon neutralizing", should support large-scale grid-connected utilization of distributed renewable energy sources and plug-and-play access and quit of flexible loads, which leads to a high uncertainty and a "double-high" characteristic of the system, resulting in a large variety of power quality pollution sources, high density and tight pollution disturbance-coupling. Among them, voltage problems are one of most important power quality problems of the active distribution network.

At present, voltage regulation techniques at home and abroad adopt a local distributed control method, which configures regulation devices at a source terminal, a grid terminal, a load terminal and a storage terminal respectively according to their pollution conditions. Such voltage regulation techniques are neither collaborative nor global, and the distributed regulation devices consume a large amount of input cost and cannot fulfill an expected effect, control objectives may contradict and repel each other, and cannot be balanced. So, it is urgency needed to explore a systematic voltage regulation method and technique based on multi-terminal collaboration.

SUMMARY

The objective of the invention is to overcome the defects of the prior art by providing a long, short and multi-timescale voltage regulation method based on source-grid-load-storage multi-terminal collaboration of a power distribution network, so as to solve the problem of separate regulation of terminals of existing techniques and methods.

To solve the aforementioned technical problems, the invention provides the following technical solutions:

In a first aspect, the invention provides a long-timescale voltage regulation method based on source-grid-load-storage multi-terminal collaboration of a power distribution network, comprising:

Acquiring a multi-mode switching control model based on voltage security event trigger of feeders of an active power distribution network; and Establishing multi-objective optimization taking into account a source-storage-load regulation cost and a network transmission loss in each operating mode according to the multi-mode switching control model based on voltage security event trigger, to obtain optimal power values of a source terminal, a load terminal and a storage terminal over a long timescale.

Optionally, a construction process of the multi-mode switching control model based on voltage security event trigger comprises:

Establishing the multi-mode switching control model, which is composed of a septimal tuple (P, T, A, F_, F_+, $T_M$, $M_0$) of the feeders of the active power distribution network based on a Petri network, where:

$$P=\{P_1, P_2, \ldots, P_n\},$$

$$T=\{T_1, T_2, \ldots, T_{2n-2}\},$$

$$A=(P\otimes T)\cup(T\otimes P),$$

$$T_M=\{\Delta T_1, \Delta T_2, \ldots, \Delta T_{2n-2}\} \quad (1)$$

In formula (1), P is a set of discrete places, and $P_i$, $i \in \{1,2,\ldots,n\}$ is discrete places and represents operating modes of the active power distribution network; n is a total number of voltage regulator taps; T is a set of all discrete transitions; A is a set of all arcs, the modes are connected to the corresponding transitions through the directed arcs in A, and these directed arcs are associated with predecessor arcs defined in F_ or successor arcs defined in F_+ respectively, and $\otimes$ is a Cartesian product; F_ is a set of the predecessor arcs; F_+ is a set of the successor arcs; $T_M$ represents a set of discrete transition switching times; $M_0$ represents a set of all initial mode marks;

The discrete transition $T_i$, $i \in \{1,2,2n-2\}$ is triggered by a voltage security event designed as follows:

$$\text{If } t = t_0 \text{ and } V_{rm}(t) \text{ falls to } V_{rm}(t) < V_{ref} - \frac{V_{db}}{2}, \quad (2)$$

$$ETSC(T_i) = S(t-t_0) - S(t-t_0-\Delta T_i), i \in \{1, 2, \ldots n-1\}$$

$$\text{If } t = t_0 \text{ and } V_{rm}(t) \text{ rises to } V_{rm}(t) > V_{ref} + \frac{V_{db}}{2}, \quad (3)$$

$$ETSC(T_i) = S(t-t_0) - S(t-t_0-\Delta T_{n-2+i}), i \in \{2, 3, \ldots n\}$$

Formula (2) indicates that the discrete transition $T_i$, i=1, 2,n−1 is triggered when $V_{rm}(t)$ falls to a lower threshold $$V_{ref} - \frac{V_{db}}{2}$$

and $DT_i$ time later, the operating mode is switched from $P_i$ to $P_{i+1}$; formula (3) indicates that $T_{n-2+i}$, i=2,3, . . . ,n is triggered when $V_{rm}(t)$ rises to an upper threshold $$V_{ref} + \frac{V_{db}}{2}$$

and $DT_{n-23+i}$ time later, the operating mode is switched from $P_i$ to $P_{i-1}$; where, ETSC($T_i$) is a trigger function of the discrete transition $T_i$, $V_{ref}$ a voltage reference value, $V_{db}$ is a voltage error dead zone, and $V_{rm}(t)$ is a moving average of a secondary voltage of a voltage regulator, which is specifically expressed as:

$$V_{rm}(t) = \begin{cases} \sum_{\tau=1}^{t} V(\tau)/t, & t \leq N \\ \sum_{\tau=t-N+1}^{t} V(\tau)/N, & t > N \end{cases} \quad (4)$$

In formula (4), N is a length of a sliding time window, $V(\tau)$ is the secondary voltage of the voltage regulator at a time $\tau$, and t represents a present time; in formula (2) and formula (3), a step function $S(t-t_0)$ is expressed as:

$$S(t-t_0) = \begin{cases} 1, & t \geq t_0 \\ 0, & t < t_0 \end{cases} \quad (5)$$

In formula (5), t represents a present time, and $t_0$ represents a certain time.

Optionally, the multi-objective optimization taking into account the source-storage-load regulation cost and the network transmission loss comprises:

An objective function of the regulation cost, which is specifically expressed as:

$$f_1(t) = \left\{ \sum_{i \in N_d} F_i^d(t) + \sum_{j \in N_e} F_j^e(t) + \sum_{l \in N_s} F_l^s(t) \right\} \quad (6)$$

In formula (6), $F_i^d(t)$, $F_j^e(t)$ and $F_l^s(t)$ represent an operating return of $i^{th}$ distributed new energy, an operating cost of $j^{th}$ energy storage, and an operating cost of an $l^{th}$ SVC at the time t respectively; $N_d$, $N_e$ and $N_s$ represent a set of distributed new energy, a set of energy storage and a set of SVCs respectively; $F_i^d(t)$, $F_j^e(t)$ and $F_l^s(t)$ are expressed by the following quadratic functions:

$$\begin{cases} F_i^d(t) = \frac{1}{2}\alpha_1^d P_i^{DG}(t)^2 + \alpha_2^d P_i^{DG}(t) + \alpha_3^d, \forall i \in N_d \\ F_j^e(t) = \frac{1}{2}\alpha_1^e P_j^{ES}(t)^2 + \alpha_2^e P_j^{ES}(t) + \alpha_3^e, \forall j \in N_e \\ F_l^s(t) = \frac{1}{2}\alpha_1^s Q_l^{SVC}(t)^2 + \alpha_2^s Q_l^{SVC}(t) + \alpha_3^s, \forall l \in N_s \end{cases} \quad (7)$$

In formula (7), $a_1^d$, $a_2^d$ and $a_3^d$ are operating return coefficients of the $i^{th}$ distributed new energy, which are all negative values; $a_1^e$, $a_2^e$ and $a_3^e$ are operating cost coefficients of the $j^{th}$ energy storage, which are all positive values; $a_1^s$, $a_2^s$ and $a_3^s$ are operating cost coefficients of the $l^{th}$ SVC, which are all positive values; $P_i^{DG}(t)$, $P_j^{ES}(t)$ and $Q_l^{SVC}(t)$ are an active power output of the $i^{th}$ distributed new energy, an active power output of the $j^{th}$ energy storage and a reactive power output of the $l^{th}$ SVC at the time t respectively;

An objective function of the network transmission loss, which is specifically expressed as:

$$f_2(t) = \sum_{i \in N} \left\{ \frac{P_i^b(t)^2 + Q_i^b(t)^2}{V_i(t)^2}(R_i + X_i) \right\} \quad (8)$$

In formula (8), $P_i^b(t)$ and $Q_i^b(t)$ are an injected active power and an injected reactive power of an $i^{th}$ node at the time t respectively; $R_i$ and $X_i$ are a resistance and a reactance of a branch circuit connected to the $i^{th}$ node respectively; $V_i(t)$ is a voltage of the $i^{th}$ node at the time t; N is a set of all nodes;

The multi-objective optimization is composed of formula (6) and formula (8), and is specifically expressed as:

$$\min\{\lambda_1 f_1(t) + \lambda_2 f_2(t)\} \quad (9)$$

In formula (9), $\lambda_1$ and $\lambda_2$ are weight factors of $f_1(t)$ and $f_2(t)$ respectively, and formula (9) meets the following constraints:

$$\underline{P}_i^{DG} \leq P_i^{DG}(t) \leq \overline{P}_i^{DG}, \forall i \in N_d \quad (10)$$

$$\underline{P}_i^{ES} \leq P_i^{ES}(t) \leq \overline{P}_i^{ES}, \forall i \in N_e \quad (11)$$

$$\underline{Q}_i^{SVC} \leq Q_i^{SVC}(t) \leq \overline{Q}_i^{SVC}, \forall i \in N_s \quad (12)$$

$$|Q_{DG,i}(t)| \leq \sqrt{S_i^{DG^2} - P_i^{DG}(t)^2}, \forall i \in N_d \quad (13)$$

$$\Delta \underline{P}_i^{DG} \leq \Delta P_i^{DG}(t) \leq \Delta \overline{P}_i^{DG}, \forall i \in N_d \quad (14)$$

$$\Delta \underline{P}_i^{ES} \leq \Delta P_i^{ES}(t) \leq \Delta \overline{P}_i^{ES}, \forall i \in N_e \quad (15)$$

$$\Delta \underline{Q}_i^{DG} \leq \Delta Q_i^{DG}(t) \leq \Delta \overline{Q}_i^{DG}, \forall i \in N_d \quad (16)$$

$$\Delta \underline{Q}_i^{SVC} \leq \Delta Q_i^{SVC}(t) \leq \Delta \overline{Q}_i^{SVC}, \forall i \in N_s \quad (17)$$

$$P_{i+1}^b(t) = P_i^b(t) - P_i^{loss}(t) + \sum_{j \in N_{d,i}} P_j^{DG}(t) + \sum_{l \in N_{e,i}} P_l^{ES}(t) - P_{i+1}^L(t), \quad (18)$$

$$\forall i \in N$$

$$Q_{i+1}^b(t) = Q_i^b(t) - Q_i^{loss}(t) + \sum_{j \in N_{d,i}} Q_j^{DG}(t) - \sum_{l \in N_{s,i}} Q_l^{SVC}(t), \quad (19)$$

$$\forall i \in N$$

$$\underline{SOC}_i \leq SOC_i(t) = \quad (20)$$

$$SOC_i(t-1) + \delta_i(t) + \delta_i(t)\frac{\int P_i^{ES}(t)}{\eta_i^d} - (1-\delta_i(t))\eta_i^c \int p_i^{ES}(t) \leq \overline{SOC}_i,$$

$$\forall i \in N_e$$

$$\sum_{j \in N_d} P_j^{DG}(t) + \sum_{l \in N_e} P_l^{ES}(t) - \sum_{i \in N} P_i^{loss}(t) = \sum_{i \in N} P_i^L(t) \quad (21)$$

Formula (10) and formula (11) represent upper and lower limit constrains of an active power of the distributed new energy and the energy storage respectively, $P_i^{DG}(t)$ and $P_i^{ES}(t)$ are the active power output of $i^{th}$ distributed new energy and the active power output of the $i^{th}$ energy storage at the time t respectively, $\overline{P}_i^{DG}$ and $\underline{P}_i^{DG}$ are an upper limit and a lower limit of the active power of the $i^{th}$ distributed new energy respectively, and $\overline{P}_i^{ES}$ and $\underline{P}_i^{ES}$ are an upper limit and a lower limit of the active power of the $i^{th}$ energy storage respectively;

Formula (12) and formula (13) represents upper and lower limit constraints of a reactive power of the SVGs and the distributed new energy respectively, $Q_i^{SVC}(t)$ and $Q_{DG,i}(t)$ are the reactive power output of the $i^{th}$ SVG and the reactive power output of the $i^{th}$ distributed new energy at the time t respectively, $\overline{Q}_i^{SVC}$ and $\underline{Q}_i^{SVC}$ are an upper limit and a lower limit of the reactive power of the $i^{th}$ SVG respectively, and $S_i^{DG}$ is a capacity of the $i^{th}$ distributed new energy;

Formula (14) and formula (15) represent active power ramp constraints of the distributed new energy and the energy storage respectively, $\Delta P_i^{DG}(t)=P_i^{DG}(t)-P_i^{DG}(t-1)$ and $\Delta P_i^{ES}(t)=P_i^{ES}(t)-P_i^{ES}(t-1)$ are variations of the active power output of the $i^{th}$ distributed new energy and the active power output of the $i^{th}$ energy storage at the time t respectively, $\Delta \overline{P}_i^{DG}$ and $\Delta \underline{P}_i^{DG}$ are an upper limit and a lower limit of an active power ramp of the $i^{th}$ distributed new energy respectively, and $\Delta \overline{P}_i^{ES}$ and $\Delta \underline{P}_i^{ES}$ are an upper limit and a lower limit of an active power ramp of the $i^{th}$ energy storage respectively;

Formula (16) and formula (17) are reactive power ramp constraints of the distributed new energy and the SVCs respectively, $\Delta Q_i^{DG}(t)=Q_i^{DG}(t)-Q_i^{DG}(t-1)$ and $\Delta Q_i^{SVC}(t)=Q_i^{SVC}(t)-Q_i^{SVC}(t-1)$ are variations of the reactive power output of the $i^{th}$ distributed new energy and the reactive power output of the $i^{th}$ SVC at the time t respectively, and $\Delta \overline{Q}_i^{DG}$ and $\Delta \underline{Q}_i^{DG}$ are an upper limit and a lower limit of a reactive power ramp of the $i^{th}$ distributed new energy respectively, and $\Delta \overline{Q}_i^{SVC}$ and $\Delta \underline{Q}_i^{SVC}$ are an upper limit and a lower limit of a reactive power ramp of the $i^{th}$ SVC respectively;

Formula (18) and formula (19) are an active power balance constraint and a reactive power balance constraint of adjacent nodes respectively, $P_i^b(t)$ and $Q_i^b(t)$ are the injected active power and the injected reactive power of the $i^{th}$ node at the time t respectively, $P_{i+1}^b(t)$ and $Q_{i+1}^b(t)$ are an injected active power and an injected reactive power of a $(i+1)^{th}$ node at the time t respectively, $P_i^{loss}(t)$ and $Q_i^{loss}(t)$ are an active power loss and a reactive power loss of the $i^{th}$ node at the time t respectively, $P_j^{DG}(t)$ and $Q_j^{DG}(t)$ are an active power output of the $j^{th}$ distributed new energy and an active power output the $j^{th}$ energy storage at the time t respectively, $N_{d,i}$ is a set of distributed new energy located at the $i^{th}$ node, $P_l^{ES}(t)$ and $Q_l^{SVC}(t)$ are an active power output of an $l^{th}$ energy storage and a reactive power output of an $l^{th}$ energy SVG at the time t respectively, $N_{e,i}$ and $N_{s,i}$ are a set of energy storage located at the $i^{th}$ node and a set of SVGs located at the $i^{th}$ node respectively, and $P_{i+1}^L(t)$ is an active power consumed by loads at the (i+1)th node at the time t;

Formula (20) is an SOC constraint of the energy storage, $SOC_i(t)$ is an SOC of the $i^{th}$ energy storage at the time t, $\overline{SOC}_i$ and $\underline{SOC}_i$ are an upper limit and a lower limit of the SOC of the $i^{th}$ energy storage respectively, $\delta_i(t)$ is a charge-discharge coefficient of the $i^{th}$ energy storage at the time t, $\delta_i(t)=1$ is discharge of the energy storage, $\delta_i(t)=0$ is charge of the energy storage, and $\eta_i^d$ and $\eta_i^c$ are charge efficiency and discharge efficiency of the $i^{th}$ energy storage respectively;

Formula (21) is an active power balance constraint of a system.

In a second aspect, the invention provides a short-timescale voltage regulation method based on source-grid-load-storage multi-terminal collaboration of a power distribution network, comprising:

Acquiring a source-storage-load multi-terminal collaboration-based power coordinated control model;

Obtaining a source-storage-load multi-terminal collaboration-based distributed voltage control model based on voltage security event trigger according to the source-storage-load multi-terminal collaboration-based power coordinated control model; and Solving the source-storage-load multi-terminal collaboration-based distributed voltage control model based on voltage security event trigger in a receding horizon to obtain an optimal power control sequence of a source terminal, a load terminal and a storage terminal over a short timescale.

Optionally, the source-storage-load multi-terminal collaboration-based power coordinated control model comprises:

An active power model of a distributed new energy inverter, which is established by the following formula:

$$\begin{cases} \Delta i_{od} = \dfrac{1}{1+sT_{in}^p}\left(k_p^p + \dfrac{k_i^p}{s}\right)\left(\Delta P_{ref}^{DG} - \Delta P_{DG}\right) \\ \Delta P_{DG} = \dfrac{3u_{od}}{2}\Delta i_{od} \\ \Delta P_{int} = \dfrac{\Delta P_{ref}^{DG} - \Delta P_{DG}}{s} \end{cases} \quad (22)$$

In formula (22), $\Delta P_{ref}^{DG}$ is a difference between an actual reference active power and a current active power of the distributed new energy inverter, $\Delta i_{od}$ is a difference between a d-axis current component at a present time and a d-axis current component at a previous time of the distributed new energy inverter, $T_{in}^p$ is a time constant of an inner current loop of an active power of the distributed new energy inverter, $k_p^p$ and $k_i^p$ are a proportion coefficient and an integral coefficient of an outer current loop PI controller respectively, $u_{od}$ is a d-axis component of an output port voltage of the distributed new energy inverter, $\Delta P_{DG}$ is a difference between an output active power at the present time and an output active power at the previous time of the distributed new energy inverter, $\Delta P_{int}$ is an integral of a difference between $\Delta P_{ref}^{DG}$ and $\Delta P_{DG}$, and s is a Laplace operator;

A reactive power model of the distributed new energy inverter, which is obtained in a way similar to formula (22):

$$\begin{cases} \Delta i_{oq} = \dfrac{1}{1+sT_{in}^q}\left(k_p^q + \dfrac{k_i^q}{s}\right)\left(\Delta Q_{ref}^{DG} - \Delta Q_{DG}\right) \\ \Delta Q_{DG} = -\dfrac{3u_{od}}{2}\Delta i_{oq} \\ \Delta Q_{int} = \dfrac{\Delta Q_{ref}^{DG} - \Delta Q_{DG}}{s} \end{cases} \quad (23)$$

In formula (23), $\Delta Q_{ref}^{DG}$ is a difference between an actual reference reactive power and a current reactive power of the distributed new energy inverter, $\Delta i_{oq}$ is a difference between a d-axis current component at the present time and a d-axis current component at the previous time of the distributed new energy inverter, $T_{in}^q$ is a time constant of an inner current loop of a reactive power of the distributed new energy inverter, $k_p^q$ and $k_i^q$ are a proportion coefficient and an integral coefficient of an outer current loop PI controller respectively, $u_{od}$ is a d-axis component of an output port voltage of the distributed new energy inverter, $\Delta Q_{DG}$ is a difference between an output reactive power at the present time and an output reactive power at the previous time of the distributed new energy inverter, and $\Delta Q_{int}$ is an integral of a difference between $\Delta Q_{ref}^{DG}$ and $\Delta Q_{DG}$;

An active power model of an energy storage inverter, which is established by the following formula:

$$\begin{cases} \Delta i_L = \dfrac{1}{1+sT_{in}^d}\left(k_p^d + \dfrac{k_i^d}{s}\right)\left(\Delta P_{ref}^{ES} - \Delta P_{ES}\right) \\ \Delta P_{ES} = U_{ES}\Delta i_L \\ \Delta P_{int}^d = \dfrac{\Delta P_{ref}^{ES} - \Delta P_{ES}}{s} \end{cases} \quad (24)$$

In formula (24), $\Delta P_{ref}^{ES}$ is a difference between an actual reference power and a current power of the energy storage inverter, $\Delta i_L$ is a difference between a port output current at a present time and a port output current of a previous time of the energy storage inverter, $T_{in}^d$ is a time constant of an inner current loop of an active power of the energy storage inverter, $k_p^d$ and $k_i^d$ are a proportion coefficient and an integral coefficient of an outer current loop PI controller respectively, $U_{ES}$ is an output port voltage of the energy storage inverter, $\Delta P_{ES}$ is a difference between an output power at the present time and an output power at the previous time of the energy storage inverter, and $\Delta P_{int}^d$ is an integral of a difference between $\Delta P_{ref}^{ES}$ and $\Delta P_{ES}$;

A reactive power model of an SVC inverter, which is established by the following formula:

$$\begin{cases} \Delta B_{SVC} = \dfrac{1}{1+sT_{SVC}} \Delta u_{SVC} \\ \Delta Q_{SVC} = \Delta B_{SVC} U_{SVC}^2 \end{cases} \quad (25)$$

In formula (25), $\Delta B_{SVC}$ is a difference between a current value and a value at a previous time of an equivalent susceptance of the SVC inverter, $T_{SVC}$ is a time constant of a control loop of the SVC inverter, $\Delta u_{SVC}$ is a difference between a current value and a value at the previous time of a control variable of the SVC inverter, $U_{SVC}$ is an output port voltage of the SVC inverter, and $\Delta Q_{SVC}$ is a difference between an output power at a present time and an output power at the previous time of the SVC inverter;

The source-storage-load multi-terminal collaboration-based power coordinated control model is established based on formula (22), formula (23), formula (24) and formula (25), and is specifically expressed as:

$$\dot{x}_c = A_c x_c + B_c u_c \quad (26)$$

Where, $x_c = \left[\Delta x_c^{p^T}, \Delta x_c^{q^T}, \Delta x_c^{d^T}, \Delta x_c^{s^T}\right]^T$, $u_c = \left[\Delta P_{ref}^{DG^T}, \Delta Q_{ref}^{DG^T}, \Delta P_{ref}^{ES^T}, \Delta u_{SVC}^T\right]^T$, $A_c = \mathrm{diag}(A_c^p, A_c^q, A_c^d, A_c^s)$, $B_c = \mathrm{diag}(B_c^p, B_c^q, B_c^d, B_c^s)$, $\Delta x_c^p = [\Delta P_{DG}, \Delta P_{int}, \Delta i_{od}]^T$, $\Delta x_c^q = [\Delta Q_{DG}, \Delta Q_{int}, \Delta i_{oq}]^T$, $\Delta x_c^d = [\Delta P_{ES}, \Delta P_{int}^d, \Delta i_L]^T$, $\Delta x_c^s = [\Delta Q_{SVC}]^T$, $A_c^p = \begin{bmatrix} 0 & 0 & \tfrac{3}{2}u_{od} \\ -1 & 0 & 0 \\ -\tfrac{k_p^p}{T_{in}^p} & \tfrac{k_i^p}{T_{in}^p} & -\tfrac{1}{T_{in}^p} \end{bmatrix}$, $A_c^q = \begin{bmatrix} 0 & 0 & -\tfrac{3}{2}u_{od} \\ -1 & 0 & 0 \\ -\tfrac{k_p^q}{T_{in}^q} & \tfrac{k_i^q}{T_{in}^q} & -\tfrac{1}{T_{in}^q} \end{bmatrix}$, $A_C^d = \begin{bmatrix} 0 & 0 & U_{ES} \\ -1 & 0 & 0 \\ -\tfrac{k_p^d}{T_{in}^d} & \tfrac{k_i^d}{T_{in}^d} & -\tfrac{1}{T_{in}^d} \end{bmatrix}$, $A_c^s = \left[-\tfrac{1}{T_{SVC}}\right]$, $B_c^p = \begin{bmatrix} 0 \\ 1 \\ \tfrac{k_p^p}{T_{in}^p} \end{bmatrix}$, $B_c^q = \begin{bmatrix} 0 \\ 1 \\ \tfrac{k_p^q}{T_{in}^q} \end{bmatrix}$, $B_c^d = \begin{bmatrix} 0 \\ 1 \\ \tfrac{k_p^d}{T_{in}^d} \end{bmatrix}$, $B_c^s = \left[\tfrac{U_{SVC}^2}{T_{SVC}}\right]$;

Where, diag is a matrix diagonalization operation;

Formula (26) is discretized to obtain a mathematical model of the output active power of the inverter in a discrete time:

$$x(k+1) = Ax(k) + Bu(k) \quad (27)$$

In formula (27), x(k) and u(k) are discretize values of $x_c$ and $u_c$ a time k respectively, $A = e^{A_c T_p}$, $B = \int_0^{T_p} e^{A_c \tau} B_c d\tau$, and $T_p$ is a sampling time.

Optionally, the source-storage-load multi-terminal collaboration-based distributed voltage control model based on voltage security event trigger comprises:

The source-storage-load multi-terminal collaboration-based distributed voltage control network being triggered by a voltage security event designed as follows:

$$ETF = \{|\Delta V_i(k)| > \Delta \overline{V}_i\} \, OR \, \{|V_i(k) - V_{ref,i}| > \Delta V_{db,i}\} \quad (28)$$

In formula (28), ETF indicates that the source-storage-load multi-terminal collaboration-based distributed voltage control will be triggered if a voltage leap or voltage magnitude of an $i^{th}$ node at the time k exceeds a threshold; $\Delta V_i(k) = V_i(k) - V_i(k-1)$ represents a voltage leap threshold of the $i^{th}$ node at the time k, $V_i(k)$ represents a voltage magnitude threshold of the $i^{th}$ node at the time k, $V_{ref,i}$ represents a voltage reference value of the $i^{th}$ node, and $\Delta V_{db,i}$ represents a voltage off-limit dead zone of the $i^{th}$ node;

Based on formula (27), a control objective function of the source-storage-load multi-terminal collaboration-based distributed voltage control model is designed as:

$$J_i(k) = \sum_{n=1}^{N_p} \{\|\Delta V_i(k+n|k) - \Delta \overline{V}_i\|_{S_1}^2 + \|V_i(k+n|k) - V_{ref,i}\|_{S_2}^2 + \|u_i(k+n-1|k)\|_{S_3}^2\} \quad (29)$$

In formula (29), $J_i(k)$ represents a control objective function of the $i^{th}$ node; $N_p$ is a predictive step length; $\Delta V_i(k+n|k)$ is a voltage leap at a time (k+n) of the $i^{th}$ node, predicted at the time k; $V_i(k+n|k)$ is a voltage magnitude at the time (k+n) of the $i^{th}$ node, predicted at the time k; $u_i(k+n-1|k)$ is a control variable at a time (k+n−1) of the $i^{th}$ node, of which the specific composition is the same as u(k) in formula (27); $S_1$, $S_2$ and $S_3$ are corresponding weight coefficients;

The control objective function (29) meets the following constraints:

$$\Delta \underline{P}_{ref,i}^{DG} \le \Delta P_{ref,i}^{DG}(k+n-1|k) \le \Delta \overline{P}_{ref,i}^{DG}, \forall\, i \in N \quad (30)$$

$$\Delta \underline{Q}_{ref,i}^{DG} \le \Delta Q_{ref,i}^{DG}(k+n-1|k) \le \Delta \overline{Q}_{ref,i}^{DG}, \forall\, i \in N \quad (31)$$

$$\Delta \underline{P}_{ref,i}^{ES} \le \Delta P_{ref,i}^{ES}(k+n-1|k) \le \Delta \overline{P}_{ref,i}^{ES}, \forall\, i \in N \quad (32)$$

$$\Delta \underline{u}_{SVC,i} \le \Delta u_{SVC,i}(k+n-1|k) \le \Delta \overline{u}_{SVC,i}, \forall\, i \in N \quad (33)$$

$$\Delta V_i(k+n|k) = \sum_{j \in N} \left\{\frac{\partial V_i}{\partial P_j^b} \Delta P_j^b(k+n|k) + \frac{\partial V_i}{\partial Q_j^b} \Delta Q_j^b(k+n|k)\right\}, \quad (34)$$

$\forall\, i, j \in N$

Formula (30) and formula (31) represent an active power regulation quantity constraint and a reactive power regulation quantity constraint of distributed new energy respectively, $\Delta P_{ref,i}^{DG}(k+n-1|k)$ and $\Delta Q_{ref,i}^{DG}(k+n-1|k)$ represent an active power regulation quantity and a reactive power regulation quantity of an $i^{th}$ distributed new energy at the time (k+n−1) respectively, $\Delta \overline{P}_{ref,i}^{DG}$ and $\Delta \underline{P}_{ref,i}^{DG}$ are an upper limit and a lower limit of the active power regulation quantity of the $i^{th}$ distributed new energy respectively, and $\Delta \overline{Q}_{ref,i}^{DG}$ and $\Delta \underline{Q}_{ref,i}^{DG}$ are an upper limit and a lower limit of the reactive power regulation quantity of the $i^{th}$ distributed new energy respectively;

Formula (32) and formula (33) represent an active power regulation quantity constraint of energy storage and a reactive power regulation quantity constraint of SVCs respectively, $\Delta P_{ref,i}^{ES}(k+n-1|k)$ and $\Delta u_{SVC,i}(k+n-1|k)$ are an active power regulation quantity of $i^{th}$ energy storage and a control variation of the $i^{th}$ SVC at the time $(k+n-1)$ respectively, $\Delta \overline{P}_{ref,i}^{ES}$ and $\Delta \underline{P}_{ref,i}^{ES}$ are an upper limit and a lower limit of the active power regulation quantity of the $i^{th}$ energy storage respectively, and $\Delta \overline{u}_{SVC,i}$ and $\Delta \underline{u}_{SVC,i}$ are an upper limit and a lower limit of the control variation of the $i^{th}$ SVC respectively;

Formula (34) indicates a relationship between voltage and injection power of nodes of the active power distribution network, $\Delta P_j^b(k+n|k)$ and $\Delta Q_j^b(k+n|k)$ are an injected active power variation and an injected reactive power variation of the $j^{th}$ node at the time $(k+n)$ respectively, and $$\frac{\partial V_i}{\partial P_j^b} \text{ and } \frac{\partial V_i}{\partial Q_j^b}$$

are variation coefficients of a voltage of the $i^{th}$ node with respect to an injected active power and an injected reactive power of the $j^{th}$ node respectively; N is a set of the nodes of the active power distribution network;

The source-storage-load multi-terminal collaboration-based distributed voltage control model is established based on the objective function (29) and constraints (30)-(34) of the nodes, and is specifically expressed as:

$$\mathfrak{J}_{ri}(k) = \sum_{i=1}^{M} \varphi_i J_i(u_1^{p-1}, \ldots, u_{i-1}^{p-1}, u_i^p, u_{i+1}^{p-1} \ldots, u_M^{p-1}) \quad (35)$$

In formula (35), $\varphi_i$ is a weight coefficient of the objective function of the $i^{th}$ node, M represents the number of the nodes of the active power distribution network, $u_i^p$ is a value of the control variable of the $i^{th}$ node during iteration p, and $u_{j-1}^{p-1}$, $j \neq i$, $j \in \{1,2,\ldots,M\}$ represents a value of the control variable of the $j^{th}$ node during iteration $(p-1)$; and similarly, formula (35) meets constraints (30)-(34).

Optionally, solving the source-storage-load multi-terminal collaboration-based distributed voltage control model based on voltage security event trigger in a receding horizon to obtain an optimal power control sequence of a source terminal, a load terminal and a storage terminal, comprising:

Step 1: determining whether ETF in (28) is triggered at the time k; if so, performing Step 2; otherwise, letting k=k+1, and performing Step 1 again;

Step 2: initializing a convergence threshold $\epsilon$, a maximum number of iterations $\overline{p}(k)$, a number of iterations p=1, and performing Step 3;

Step 3: determining whether a 2-norm $\|u_i^p - u_i^{p-1}\|_2$ of the control variable during two iterations is greater than the convergence threshold $\epsilon$ and whether the number of iterations p is less than $\overline{p}(k)$; if so, performing Step 4; otherwise, performing Step 5;

Step 4: solving the objective function (35) of the source-storage-load multi-terminal collaboration-based distributed voltage control model to obtain an optimization control sequence $u_i^{p,*}$, in which p=p+1; updating $u_i^p$ by formula (36); performing Step 3;

$$u_i^p = \varphi_i u_i^{p,*} + (1-\varphi_i) u_i^{p-1} \quad (36)$$

Where, $\varphi_i$ is a weight coefficient of the objective function of the $i^{th}$ node; and Step 5: issuing a control variable at an initial position of $u_i^p$ to the distributed new energy inverter, the energy storage inverter and the SVC inverter, where k=k+1; and performing Step 1.

In a third aspect, the invention further provides a multi-timescale voltage regulation method based on source-grid-load-storage multi-terminal collaboration of a power distribution network, comprising:

Acquiring a multi-mode switching control model based on voltage security event trigger of feeders of an active power distribution network;

Establishing multi-objective optimization taking into account a source-storage-load regulation cost and a network transmission loss in each operating mode according to the multi-mode switching control model based on voltage security event trigger, to obtain optimal power values of a source terminal, a load terminal and a storage terminal over a long timescale;

Acquiring a source-storage-load multi-terminal collaboration-based power coordinated control model;

Obtaining a source-storage-load multi-terminal collaboration-based distributed voltage control model based on voltage security event trigger according to the source-storage-load multi-terminal collaboration-based power coordinated control model; and Solving the source-storage-load multi-terminal collaboration-based distributed voltage control model based on voltage security event trigger in a receding horizon to obtain an optimal power control sequence of a source terminal, a load terminal and a storage terminal over a short timescale.

According to the multi-timescale voltage regulation method based on source-grid-load-storage multi-terminal collaboration of a power distribution network provided by the invention:

First, the multi-mode switching control model based on voltage security event trigger of the feeders of the active power distribution network is established based on a Petri network over a long-timescale;

Multi-objective optimization taking into account the source-storage-load regulation cost and the network transmission loss in each operating mode is established according to the multi-mode switching control model based on voltage security event trigger, to obtain optimal power values of the source terminal, the load terminal and the storage terminal over the long timescale;

Then, the source-storage-load multi-terminal collaboration-based power coordinated control model is established over a short-timescale according to operating characteristics of the source terminal, the load terminal and the storage terminal; the source-storage-load multi-terminal collaboration-based distributed voltage control model based on voltage security event trigger is established according to the source-storage-load multi-terminal collaboration-based power coordinated control model; and The distributed voltage control model is solved in the receding horizon to obtain the optimal power control sequence of the source terminal, the load terminal and the storage terminal.

Compared with the prior art, the invention has the following beneficial effects: over a long timescale, multi-mode switching control is designed to switch operating modes of the active power distribution network, and in each operating mode, multi-objective optimization is designed to realize an optimal global network loss and an optimal operating cost, so that the overall economy of a system is guaranteed under the precondition of guaranteeing the security of the active power distribution network; and over a short timescale, completely distributed coordinated regulation control is realized by means of the collaboration of inverters of a source terminal, a load terminal and a storage terminal, so that many voltage problems of the active power distribution network are solved, the response speed is high, the voltage control effect is good, and the privacy of information is guaranteed under the precondition of realizing plug-and-play characteristics.

BRIEF DESCRIPTION OF THE DRAWINGS

FIG. 9 is an architectural diagram of an IEEE 33 Bus simulation system according to one embodiment of the invention;

DETAILED DESCRIPTION

The invention will be further described below in conjunction with the accompanying drawings. The following embodiments are merely used to more clearly explain the technical solutions of the invention, and should not be construed as limitations of the protection scope of the invention.

Figure 1:
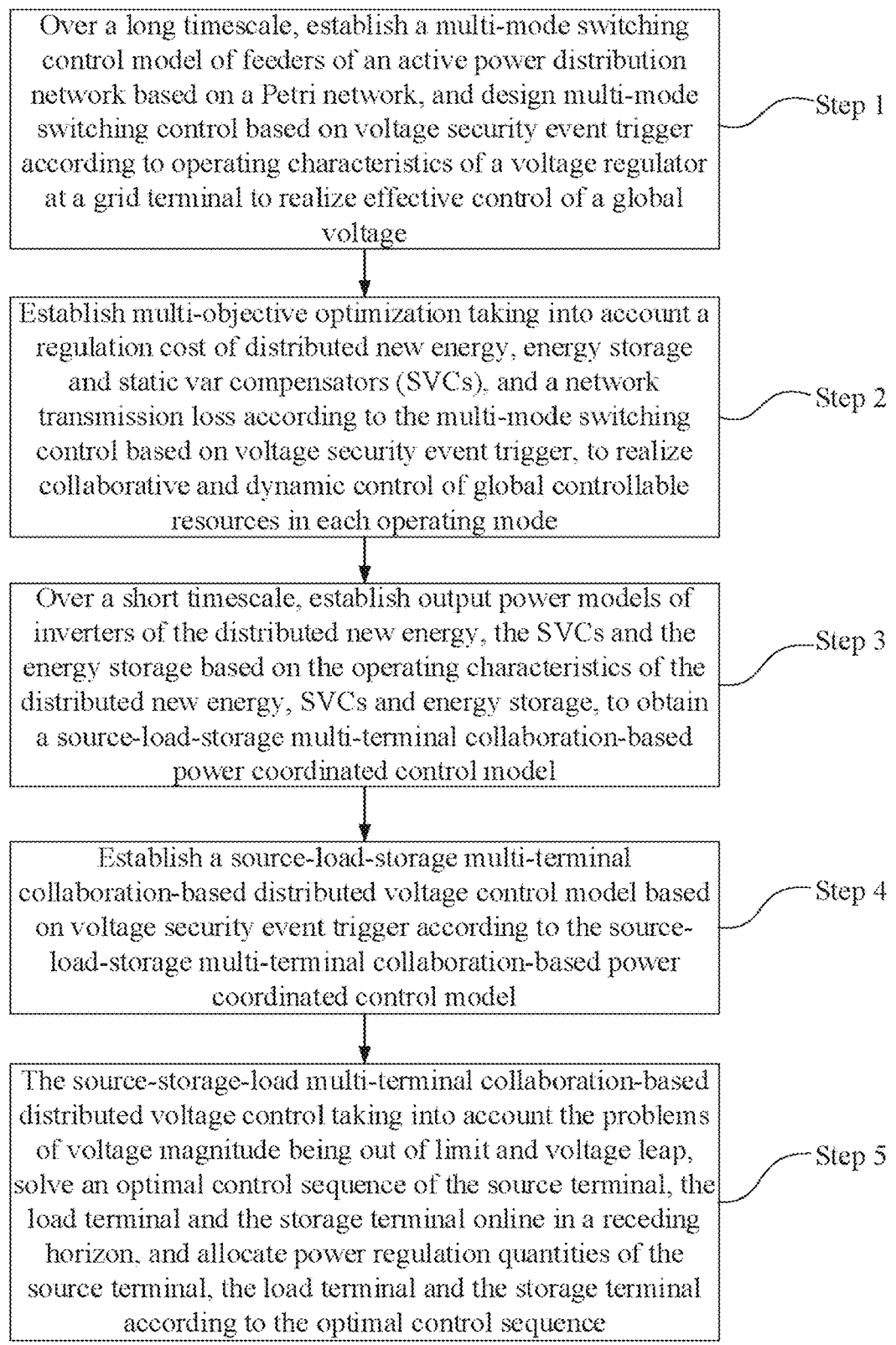
FIG. 1 is a flow diagram for the implementation of a multi-timescale voltage regulation method based on source-grid-load-storage multi-terminal collaboration of a power distribution network according to one embodiment of the invention.
Figure 2:
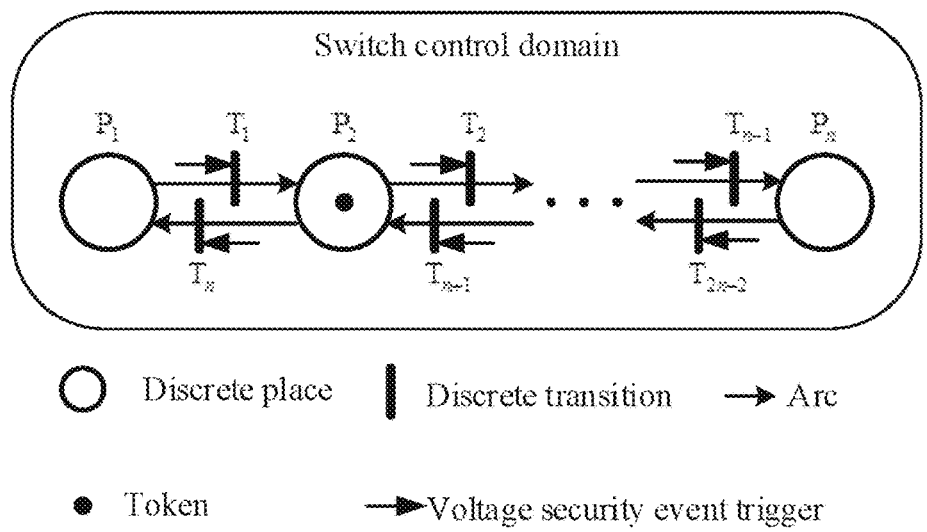
FIG. 2 illustrates a multi-mode switching control model based on voltage security event trigger according to one embodiment of the invention.

One embodiment of the invention provides a multi-timescale voltage regulation method based on source-grid-load-storage multi-terminal collaboration of a power distribution network. A source terminal refers to distributed new energy, a grid terminal refers to a device for coordinating the base voltage of a whole grid, represented by a voltage regulator, a storage terminal refers to energy storage, and a load terminal refers to SVCs. As shown in FIG. 1, the method comprises the following steps:

Step 1: over a long timescale, a multi-mode switching control model of feeders of an active power distribution network is established based on a Petri network, and a multi-mode switch control model based on voltage security event trigger is designed according to operating characteristics of a voltage regulator at the grid terminal to realize effective regulation of a global voltage;

Each feeder of the active power distribution network comprises source-grid-load-storage devices, and regulation of the grid terminal refers to multi-mode switching of the voltage regulator. As show in FIG. 2, the multi-mode switching control model of the feeders of the active power distribution network established based on the Petri network over the long timescale is composed of a septimal tuple (P, T, A, F_-, F_+, T_M, M_0), wherein:

$$P=\{P_1, P_2, \ldots, P_n\},$$

$$T=\{T_1, T_2, \ldots, T_{2n-2}\},$$

$$A=(P \otimes T) \cup (T \otimes P),$$

$$T_M=\{\Delta T_1, \Delta T_2, \ldots, \Delta T_{2n-2}\} \qquad (1)$$

In formula (1), P is a set of discrete places, and $P_i$, $i \in \{1,2,\ldots,n\}$ is discrete places and represents operating modes of the active power distribution network; n is a total number of voltage regulator taps; T is a set of all discrete transitions; A is a set of all arcs, the modes are connected to the corresponding transitions through the directed arcs in A, and these directed arcs are associated with predecessor arcs defined in $F_-$ or successor arcs defined in $F_+$ respectively, and $\otimes$ is a Cartesian product; $F_-$ is a set of the predecessor arcs; $F_+$ is a set of the successor arcs; $T_M$ represents a set of discrete transition switching times; $M_0$ represents a set of all initial mode marks.

The discrete transition $T_i$, $i \in \{1,2,2n-2\}$ is triggered by a voltage security event designed as follows:

If $t=t_0$ and $V_{rm}(t)$ falls to $$V_{rm}(t) < V_{ref} - \frac{V_{db}}{2},$$

$$\text{ETSC}(T_i)=S(t-t_0)-S(t-t_0-\Delta T_i), i \in \{1,2,\ldots n-1\} \qquad (2)$$

If $t=t_0$ and $V_{rm}(t)$ rises to $$V_{rm}(t) > V_{ref} + \frac{V_{db}}{2},$$

$$\text{ETSC}(T_i)=S(t-t_0)-S(t-t_0-\Delta T_{n-2+i}), i \in \{2,3,\ldots n-1\} \qquad (3)$$

Formula (2) indicates that the discrete transition $T_i$, i=1, 2,n−1 is triggered when $V_{rm}(t)$ falls to a lower threshold $$V_{ref} - \frac{V_{db}}{2}$$

and $DT_i$ time later, the operating mode is switched from $P_i$ to $P_{i+1}$; formula (3) indicates that $T_{n-2+i}$, i=2,3, ..., n is triggered when $V_{rm}(t)$ rises to an upper threshold $$V_{ref} + \frac{V_{db}}{2}$$

and $DT_{n-2+i}$ time later, the operating mode is switched from $P_i$ to $P_{i-1}$; where, ETSC ($T_i$) is a trigger function of the discrete transition $T_i$, $V_{ref}$ a voltage reference value, $V_{db}$ is a voltage error dead zone, and $V_{rm}(t)$ is a moving average of a secondary voltage of a voltage regulator, which is specifically expressed as:

$$V_{rm}(t) = \begin{cases} \sum_{\tau=1}^{t} V(\tau)/t, \ t \le N \\ \sum_{\tau=t-N+1}^{t} V(\tau)/N, \ t > N \end{cases} \quad (4)$$

In formula (4), N is a length of a sliding time window, $V(\tau)$ is the secondary voltage of the voltage regulator at a time $\tau$, and t represents a present time; in formula (2) and formula (3), a step function $S(t-t_0)$ is expressed as:

$$S(t - t_0) = \begin{cases} 1, \ t \ge t_0 \\ 0, \ t < t_0 \end{cases} \quad (5)$$

In formula (5), t represents a present time, and $t_0$ represents a certain time.

Step 2: multi-objective optimization taking into account a regulation cost of distributed new energy, energy storage and static var compensators (SVCs), and a network transmission loss in each operating mode is established according to the multi-mode switching control model based on voltage security event trigger, to obtain optimal power values of the distributed new energy, the energy storage and the SVCs so as to realize collaborative and dynamic control of controllable resources (source-storage-load) in each operating mode;

The multi-objective optimization in each operating mode comprises objective functions of an objective function of the regulation cost of the distributed new energy, the energy storage and the SVCs, and an objective function of the network transmission loss, wherein the objective function of the regulation cost may be specifically expressed as:

$$f_1(t) = \left\{ \sum_{i \in N_d} F_i^d(t) + \sum_{j \in N_e} F_j^e(t) + \sum_{l \in N_s} F_l^s(t) \right\} \quad (6)$$

In formula (6), $F_i^d(t)$, $F_j^e(t)$ and $F_l^s(t)$ represent an operating return of $i^{th}$ distributed new energy, an operating cost of $j^{th}$ energy storage, and an operating cost of an $l^{th}$ SVC at the time t respectively; $N_d$, $N_e$ and $N_s$ represent a set of distributed new energy, a set of energy storage and a set of SVCs respectively; $F_i^d(t)$, $F_j^e(t)$ and $F_l^s(t)$ are expressed by the following quadratic functions:

$$\begin{cases} F_i^d(t) = \frac{1}{2}\alpha_1^d P_i^{DG}(t)^2 + \alpha_2^d P_i^{DG}(t) + \alpha_3^d, \ \forall i \in N_d \\ F_j^e(t) = \frac{1}{2}\alpha_1^e P_j^{ES}(t)^2 + \alpha_2^e P_j^{ES}(t) + \alpha_3^e, \ \forall j \in N_e \\ F_l^s(t) = \frac{1}{2}\alpha_1^s Q_l^{SVC}(t)^2 + \alpha_2^s Q_l^{SVC}(t) + \alpha_3^s, \ \forall l \in N_s \end{cases} \quad (7)$$

In formula (7), $a_1^d$, $a_2^d$ and $a_3^d$ are operating return coefficients of the $i^{th}$ distributed new energy, which are all negative values; $a_1^e$, $a_2^e$ and $a_3^e$ are operating cost coefficients of the $j^{th}$ energy storage, which are all positive values; $a_1^s$, $a_2^s$ and $a_3^s$ are operating cost coefficients of the $l^{th}$ SVC, which are all positive values; $P_i^{DG}(t)$, $P_j^{ES}(t)$ and $Q_l^{SVC}(t)$ are an active power output of the $i^{th}$ distributed new energy, an active power output of the $j^{th}$ energy storage and a reactive power output of the $l^{th}$ SVC at the time t respectively;

The objective function of the network transmission loss may be specifically expressed as:

$$f_2(t) = \sum_{i \in N} \left\{ \frac{P_i^b(t)^2 + Q_i^b(t)^2}{V_i(t)^2} (R_i + X_i) \right\} \quad (8)$$

In formula (8), $P_i^b(t)$ and $Q_i^b(t)$ are an injected active power and an injected reactive power of an $i^{th}$ node at the time t respectively; $R_i$ and $X_i$ are a resistance and a reactance of a branch circuit connected to the $i^{th}$ node respectively; $V_i(t)$ is a voltage of the $i^{th}$ node at the time t; N is a set of all nodes;

The multi-objective optimization is composed of formula (6) and formula (8), and is specifically expressed as:

$$\min\{\lambda_1 f_1(t) + \lambda_2 f_2(t)\} \quad (9)$$

In formula (9), $\lambda_1$ and $\lambda_2$ are weight factors of $f_1(t)$ and $f_2(t)$ respectively, and formula (9) meets the following constraints:

$$\underline{P}_i^{DG} \le P_i^{DG}(t) \le \overline{P}_t^{DG}, \ \forall i \in N_d \quad (10)$$

$$\underline{P}_i^{ES} \le P_i^{ES}(t) \le \overline{P}_i^{ES}, \ \forall i \in N_e \quad (11)$$

$$\underline{Q}_i^{SVC} \le Q_i^{SVC}(t) \le \overline{Q}_i^{SVC}, \ \forall i \in N_s \quad (12)$$

$$|Q_{DG,i}(t)| \le \sqrt{S_i^{DG^2} - P_i^{DG}(t)^2}, \ \forall i \in N_d \quad (13)$$

$$\Delta \underline{P}_i^{DG} \le \Delta P_i^{OG}(t) \le \Delta \overline{P}_i^{DG}, \ \forall i \in N_d \quad (14)$$

$$\Delta \underline{P}_i^{ES} \le \Delta P_i^{ES}(t) \le \Delta \overline{P}_i^{ES}, \ \forall i \in N_e \quad (15)$$

$$\Delta \underline{Q}_i^{DG} \le \Delta Q_i^{DG}(t) \le \Delta \overline{Q}_i^{DG}, \ \forall i \in N_d \quad (16)$$

$$\Delta \underline{Q}_i^{SVC} - \le \Delta Q_i^{SVC}(t) \le \Delta \overline{Q}_i^{SVC}, \ \forall i \in N_s \quad (17)$$

$$P_{i+1}^b(t) = P_i^b(t) - P_i^{loss}(t) + \sum_{j \in N_{d,i}} P_j^{DG}(t) + \sum_{l \in N_{e,i}} P_l^{ES}(t) - P_{i+1}^L(t), \quad (18)$$

$$\forall i \in N$$

$$Q_{i+1}^b(t) = Q_i^b(t) - Q_i^{loss}(t) + \sum_{j \in N_{d,i}} Q_j^{DG}(t) - \sum_{l \in N_{s,i}} Q_l^{SVC}(t) \quad (19)$$

$$\forall i \in N$$

-continued $$\underline{SOC_i} \leq SOC_i(t) = \qquad (20)$$

$$SOC_i(t-1) + \delta_i(t)\frac{\int P_i^{ES}(t)}{\eta_i^d} - (1-\delta_i(t))\eta_i^c \int p_i^{ES}(t) \leq \overline{SOC_i},$$

$$\forall i \in N_e$$

$$\sum_{j \in N_d} P_j^{DC}(t) + \sum_{i \in N_e} P_i^{ES}(t) - \sum_{i \in N} P_i^{loss}(t) = \sum_{i \in N} P_i^L(t) \qquad (21)$$

Formula (10) and formula (11) represent upper and lower limit constrains of an active power of the distributed new energy and the energy storage respectively, $P_i^{DG}(t)$ and $P_i^{ES}(t)$ are the active power output of $i^{th}$ distributed new energy and the active power output of the $i^{th}$ energy storage at the time t respectively, $\overline{P}_i^{DG}$ and $\underline{P}_i^{DG}$ are an upper limit and a lower limit of the active power of the $i^{th}$ distributed new energy respectively, and $\overline{P}_i^{ES}$ and $\underline{P}_i^{ES}$ are an upper limit and a lower limit of the active power of the $i^{th}$ energy storage respectively;

Formula (12) and formula (13) represents upper and lower limit constraints of a reactive power of the SVGs and the distributed new energy respectively, $Q_i^{SVC}(t)$ and $Q_{DG,i}(t)$ are the reactive power output of the $i^{th}$ SVG and the reactive power output of the $i^{th}$ distributed new energy at the time t respectively, $\overline{Q}_i^{SVC}$ and $\underline{Q}_i^{SVC}$ are an upper limit and a lower limit of the reactive power of the $i^{th}$ SVG respectively, and $S_i^{DG}$ is a capacity of the $i^{th}$ distributed new energy;

Formula (14) and formula (15) represent active power ramp constraints of the distributed new energy and the energy storage respectively, $\Delta P_i^{DG}(t)=P_i^{DG}(t)-P_i^{DG}(t-1)$ and $\Delta P_i^{ES}(t)=P_i^{ES}(t)-P_i^{ES}(t-1)$ are variations of the active power output of the $i^{th}$ distributed new energy and the active power output of the $i^{th}$ energy storage at the time t respectively, $\Delta \overline{P}_i^{DG}$ and $\Delta \underline{P}_i^{DG}$ are an upper limit and a lower limit of an active power ramp of the $i^{th}$ distributed new energy respectively, and $\Delta \overline{P}_i^{ES}$ and $\Delta \underline{P}_i^{ES}$ are an upper limit and a lower limit of an active power ramp of the $i^{th}$ energy storage respectively;

Formula (16) and formula (17) are reactive power ramp constraints of the distributed new energy and the SVCs respectively, $\Delta Q_i^{DG}(t)=Q_i^{DG}(t)-Q_i^{DG}(t-1)$ and $\Delta Q_i^{SVC}(t)=Q_i^{SVC}(t)-Q_i^{SVC}(t-1)$ are variations of the reactive power output of the $i^{th}$ distributed new energy and the reactive power output of the $i^{th}$ SVC at the time t respectively, and $\Delta \overline{Q}_i^{DG}$ and $\Delta \underline{Q}_i^{DG}$ are an upper limit and a lower limit of a reactive power ramp of the $i^{th}$ distributed new energy respectively, and $\Delta \overline{Q}_i^{SVC}$ and $\Delta \underline{Q}_i^{SVC}$ are an upper limit and a lower limit of a reactive power ramp of the $i^{th}$ SVC respectively;

Formula (18) and formula (19) are an active power balance constraint and a reactive power balance constraint of adjacent nodes respectively, $P_i^b(t)$ and $Q_i^b(t)$ are the injected active power and the injected reactive power of the $i^{th}$ node at the time t respectively, $P_{i+1}^b(t)$ and $Q_{i+1}^b(t)$ are an injected active power and an injected reactive power of a $(i+1)^{th}$ node at the time t respectively, $P_i^{loss}(t)$ and $Q_i^{loss}(t)$ are an active power loss and a reactive power loss of the $i^{th}$ node at the time t respectively, $P_j^{DG}(t)$ and $Q_j^{DG}(t)$ are an active power output of the $j^{th}$ distributed new energy and an active power output the $j^{th}$ energy storage at the time t respectively, $N_{d,i}$ is a set of distributed new energy located at the $i^{th}$ node, $P_l^{ES}(t)$ and $Q_l^{SVC}(t)$ are an active power output of an $l^{th}$ energy storage and a reactive power output of an $l^{th}$ energy SVG at the time t respectively, $N_{e,i}$ and $N_{s,i}$ are a set of energy storage located at the $i^{th}$ node and a set of SVGs located at the $i^{th}$ node respectively, and $P_{i+1}^L(t)$ is an active power consumed by loads at the $(i+1)$th node at the time t;

Formula (20) is an SOC constraint of the energy storage, $SOC_i(t)$ is an SOC of the $i^{th}$ energy storage at the time t, $\overline{SOC}_i$ and $\underline{SOC}_i$ are an upper limit and a lower limit of the SOC of the $i^{th}$ energy storage respectively, $\delta_i(t)$ is a charge-discharge coefficient of the $i^{th}$ energy storage at the time t, $\delta_i(t)=1$ is discharge of the energy storage, $\delta_i(t)=0$ is charge of the energy storage, and $\eta_i^d$ and $\eta_i^c$ are charge efficiency and discharge efficiency of the $i^{th}$ energy storage respectively;

Formula (21) is an active power balance constraint of a system.

Figure 3:
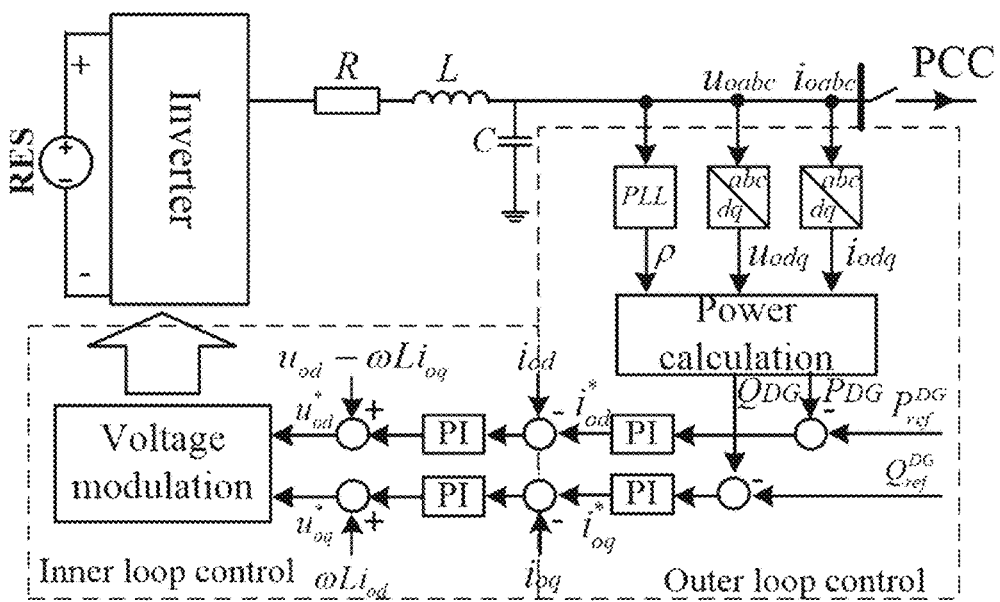
FIG. 3 is an operating principle diagram of a distributed new energy inverter in a PQ mode according to one embodiment of the invention.
Figure 4:
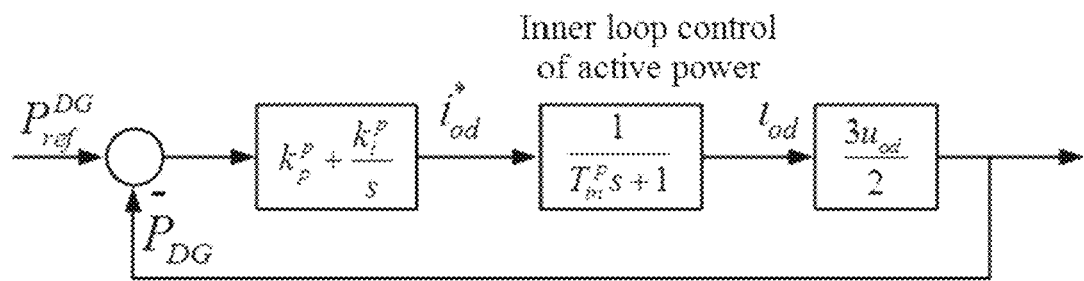
FIG. 4 illustrates an equivalent transfer function of a control loop of the distributed new energy inverter in the PQ mode according to one embodiment of the invention.

Step 3: output power models of inverters of the distributed new energy, the SVCs 15 and the energy storage are established over a short timescale based on the operating characteristics of source-storage-load (the distributed new energy, SVCs and energy storage) to obtain a source-storage-load multi-terminal collaboration-based power coordinated control model;

As shown in FIG. 3 and FIG. 4, over a short timescale, an active power model of the distributed new energy inverter is established by the following formula:

$$\begin{cases} \Delta i_{od} = \dfrac{1}{1+sT_{in}^p}\left(k_p^p + \dfrac{k_i^p}{s}\right)\left(\Delta P_{ref}^{DG} - \Delta P_{DG}\right) \\ \Delta P_{DG} = \dfrac{3u_{od}}{2}\Delta i_{od} \\ \Delta P_{int} = \dfrac{\Delta P_{ref}^{DG} - \Delta P_{DG}}{s} \end{cases} \qquad (22)$$

$\Delta P_{ref}^{DG}\Delta i_{od}$ is a difference between an actual reference active power and a current active power of the distributed new energy inverter, $\Delta i_{od}$ is a difference between a d-axis current component at a present time and a d-axis current component at a previous time of the distributed new energy inverter, $T_{in}^p$ is a time constant of an inner current loop of an active power of the distributed new energy inverter, $k_p^p$ and $k_i^p$ are a proportion coefficient and an integral coefficient of an outer current loop PI controller respectively, $u_{od}$ is a d-axis component of an output port voltage of the distributed new energy inverter, $\Delta P_{DG}$ is a difference between an output active power at the present time and an output active power at the previous time of the distributed new energy inverter, $\Delta P_{int}$ is an integral of a difference between $\Delta P_{ref}^{DG}$ and $\Delta P_{DG}$, and s is a Laplace operator.

A reactive power model of the distributed new energy inverter, which is obtained in a way similar to formula (22):

$$\begin{cases} \Delta i_{oq} = \dfrac{1}{1+sT_{in}^q}\left(k_p^q + \dfrac{k_i^q}{s}\right)\left(\Delta Q_{ref}^{DG} - \Delta Q_{DG}\right) \\ \Delta Q_{DG} = -\dfrac{3u_{od}}{2}\Delta i_{oq} \\ \Delta Q_{int} = \dfrac{\Delta Q_{ref}^{DG} - \Delta Q_{DG}}{s} \end{cases} \qquad (23)$$

In formula (23), $\Delta Q_{ref}^{DG}$ is a difference between an actual reference reactive power and a current reactive power of the distributed new energy inverter, $\Delta i_{oq}$ is a difference between a d-axis current component at the present time and a d-axis current component at the previous time of the distributed new energy inverter, $T_{in}^q$ is a time constant of an inner current loop of a reactive power of the distributed new energy inverter, $k_p^q$ and $k_i^q$ are a proportion coefficient and an integral coefficient of an outer current loop PI controller respectively, $u_{od}$ is a d-axis component of an output port voltage of the distributed new energy inverter, $\Delta Q_{DG}$ is a difference between an output reactive power at the present time and an output reactive power at the previous time of the distributed new energy inverter, and $\Delta Q_{int}$ is an integral of a difference between $\Delta Q_{ref}^{DG}$ and $\Delta Q_{DG}$; and s is a Laplace operator.

Figure 5:
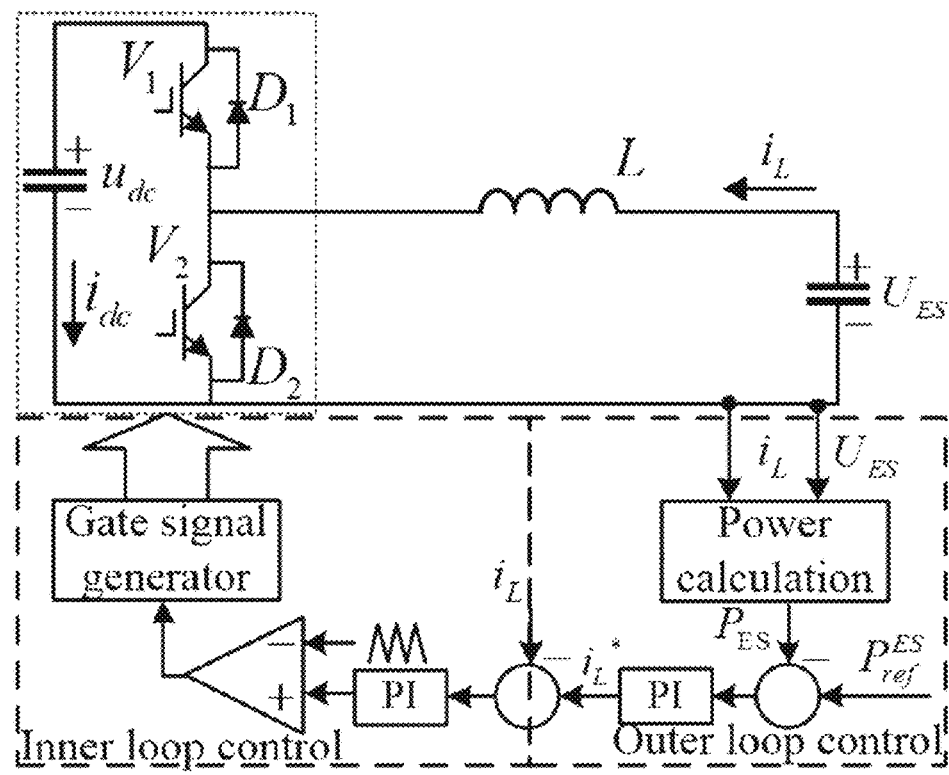
FIG. 5 is an operating principle diagram of an energy storage inverter according to one embodiment of the invention.
Figure 6:
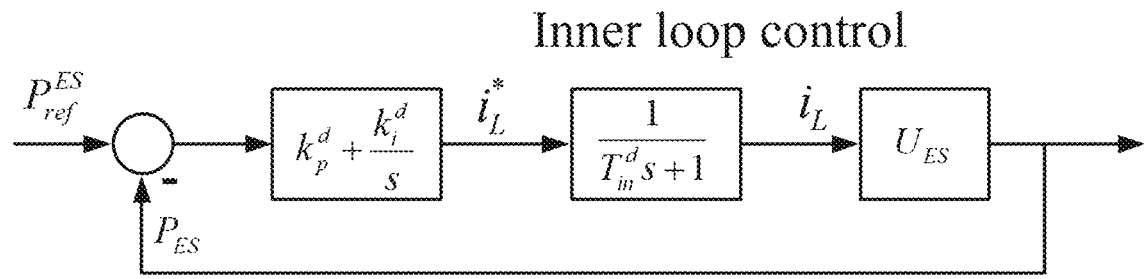
FIG. 6 illustrates an equivalent transfer function of a control loop of the energy storage inverter according to one embodiment of the invention.

As shown in FIG. 5 and FIG. 6, over a short timescale, an active power model of the energy storage inverter is established by the following formula:

$$\begin{cases} \Delta i_L = \dfrac{1}{1+sT_{in}^d}\left(k_p^d + \dfrac{k_i^d}{s}\right)(\Delta P_{ref}^{ES} - \Delta P_{ES}) \\ \Delta P_{ES} = U_{ES}\Delta i_L \\ \Delta P_{int}^d = \dfrac{\Delta P_{ref}^{ES} - \Delta P_{ES}}{s} \end{cases} \quad (24)$$

In formula (24), $\Delta P_{ref}^{ES}$ is a difference between an actual reference power and a current power of the energy storage inverter, $\Delta i_L$ is a difference between a port output current at a present time and a port output current of a previous time of the energy storage inverter, $T_{in}^d$ is a time constant of an inner current loop of an active power of the energy storage inverter, $k_p^d$ and $k_i^d$ are a proportion coefficient and an integral coefficient of an outer current loop PI controller respectively, $U_{ES}$ is an output port voltage of the energy storage inverter, $\Delta P_{ES}$ is a difference between an output power at the present time and an output power at the previous time of the energy storage inverter, and $\Delta P_{int}^d$ is an integral of a difference between $\Delta P_{ref}^{ES}$ and $\Delta P_{ES}$.

Figure 7:
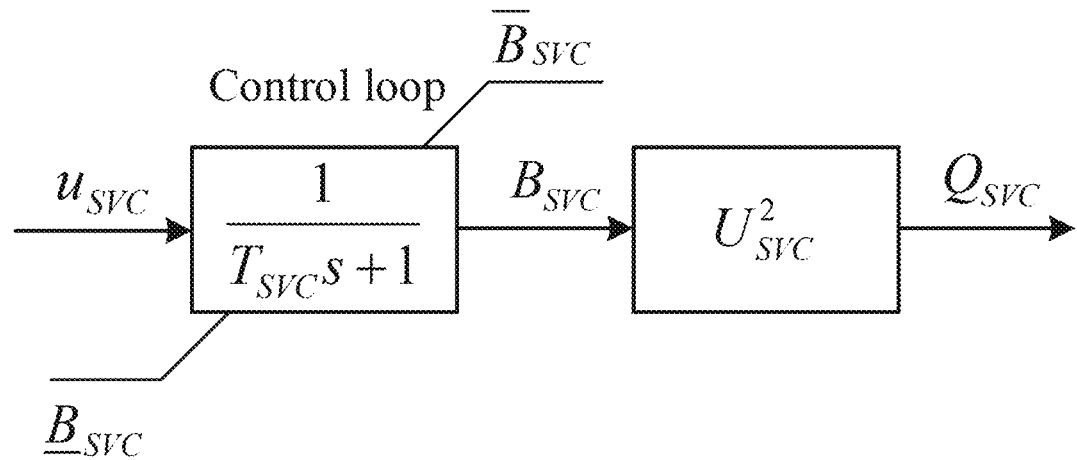
FIG. 7 illustrates an equivalent transfer function of a control loop of an SVC inverter in a reactive control mode according to one embodiment of the invention.

As shown in FIG. 7, over a short timescale, a reactive power model of the SVC inverter is established by the following formula:

$$\begin{cases} \Delta B_{SVC} = \dfrac{1}{1+sT_{SVC}}\Delta u_{SVC} \\ \Delta Q_{SVC} = \Delta B_{SVC} U_{SVC}^2 \end{cases} \quad (25)$$

In formula (25), $\Delta B_{SVC}$ is a difference between a current value and a value at a previous time of an equivalent susceptance of the SVC inverter, $T_{SVC}$ is a time constant of a control loop of the SVC inverter, $\Delta u_{SVC}$ is a difference between a current value and a value at the previous time of a control variable of the SVC inverter, $U_{SVC}$ is an output port voltage of the SVC inverter, and $\Delta Q_{SVC}$ is a difference between an output power at a present time and an output power at the previous time of the SVC inverter.

Further, the source-storage-load multi-terminal collaboration-based power coordinated control model is established based on formula (22), formula (23), formula (24) and formula (25), and is specifically expressed as:

$$\dot{x}_c = A_c x_c + B_c u_c \quad (26)$$

Where, $x_c = \left[\Delta x_c^{p^T}, \Delta x_c^{q^T}, \Delta x_c^{d^T}, \Delta x_c^{s^T}\right]^T$, $u_c = \left[\Delta P_{ref}^{DG^T}, \Delta Q_{ref}^{DG^T}, \Delta P_{ref}^{ES^T}, \Delta u_{SVC}^T\right]^T$, $A_c = \mathrm{diag}(A_c^p, A_c^q, A_c^d, A_c^s)$, $B_c = \mathrm{diag}(B_c^p, B_c^q, B_c^d, B_c^s)$, -continued $\Delta x_c^p = [\Delta P_{DG}, \Delta P_{int}, \Delta i_{od}]^T$, $\Delta x_c^q = [\Delta Q_{DG}, \Delta Q_{int}, \Delta i_{oq}]^T$, $\Delta x_c^d = [\Delta P_{ES}, \Delta P_{init}^d, \Delta i_L]^T$, $\Delta x_c^s = [\Delta Q_{SVC}]^T$, $$A_c^p = \begin{bmatrix} 0 & 0 & \frac{3}{2}u_{od} \\ -1 & 0 & 0 \\ -\frac{k_p^p}{T_{in}^p} & \frac{k_i^p}{T_{in}^p} & -\frac{1}{T_{in}^p} \end{bmatrix}, A_c^q = \begin{bmatrix} 0 & 0 & -\frac{3}{2}u_{od} \\ -1 & 0 & 0 \\ -\frac{k_p^q}{T_{in}^q} & \frac{k_i^q}{T_{in}^q} & -\frac{1}{T_{in}^q} \end{bmatrix},$$

$$A_c^d = \begin{bmatrix} 0 & 0 & U_{ES} \\ -1 & 0 & 0 \\ -\frac{k_p^d}{T_{in}^d} & \frac{k_i^d}{T_{in}^d} & -\frac{1}{T_{in}^d} \end{bmatrix}, A_c^s = \left[-\frac{1}{T_{SVC}}\right],$$

$$B_c^p = \begin{bmatrix} 0 \\ 1 \\ \frac{k_p^p}{T_{in}^p} \end{bmatrix}, B_c^q = \begin{bmatrix} 0 \\ 1 \\ \frac{k_p^q}{T_{in}^q} \end{bmatrix}, B_c^d = \begin{bmatrix} 0 \\ 1 \\ \frac{k_p^d}{T_{in}^d} \end{bmatrix}, B_c^s = \left[\frac{U_{SVC}^2}{T_{SVC}}\right].$$

Where, diag is a matrix diagonalization operation.

Formula (26) is discretized to obtain a mathematical model of the output active power of the inverter in a discrete time:

$$x(k+1) = Ax(k) + Bu(k) \quad (27)$$

$x(k)$ and $u(k)$ are discretize values of $x_c$ and $u_c$ a time k respectively, $A = e^{A_c T_p}$, $B = \int_0^{T_p} e^{A_c \tau} B_c d\tau$, and $T_p$ is a sampling time.

Step 4: a source-storage-load multi-terminal collaboration-based distributed voltage control model based on voltage security event trigger is established according to the source-storage-load multi-terminal collaboration-based power coordinated control model;

The source-storage-load multi-terminal collaboration-based distributed voltage control network being triggered by a voltage security event designed as follows:

$$ETF = \{|\Delta V_i(k)| > \Delta \overline{V}_i\} OR \{|V_i(k) - V_{ref,i}| > \Delta V_{db,i}\} \quad (28)$$

In formula (28), ETF indicates that the source-storage-load multi-terminal collaboration-based distributed voltage control will be triggered if a voltage leap or voltage magnitude of an $i^{th}$ node at the time k exceeds a threshold; $\Delta V_i(k) = V_i(k) - V_i(k-1)$ represents a voltage leap threshold of the $i^{th}$ node at the time k, $V_i(k)$ represents a voltage magnitude threshold of the $i^{th}$ node at the time k, $V_{ref,i}$ represents a voltage reference value of the $i^{th}$ node, and $\Delta V_{db,i}$ represents a voltage off-limit dead zone of the $i^{th}$ node.

Further, Based on formula (27), a control objective function of the source-storage-load multi-terminal collaboration-based distributed voltage control model is designed as:

$$J_i(k) = \sum_{n=1}^{N_p}\{\|\Delta V_i(k+n|k) - \Delta \overline{V}_i\|_{S_1}^2 + \|V_i(k+n|k) - V_{ref,i}\|_{S_2}^2 + \|u_i(k+n-1|k)\|_{S_3}^2\} \quad (29)$$

In formula (29), $J_i(k)$ represents a control objective function of the $i^{th}$ node; $N_p$ is a predictive step length; $\Delta V_i(k+n|k)$ is a voltage leap at a time $(k+n)$ of the $i^{th}$ node, predicted at the time k; $V_i(k+n|k)$ is a voltage magnitude at the time $(k+n)$ of the $i^{th}$ node, predicted at the time k; $u_i(k+n-1|k)$ is a control variable at a time $(k+n-1)$ of the $i^{th}$ node, of which the specific composition is the same as $u(k)$ in formula (27); $S_1$, $S_2$ and $S_3$ are corresponding weight coefficients.

In formula (29), the control variable is $u_i$.

Further, the control objective function (29) meets the following constraints:

$$\Delta \underline{P}_{ref,i}^{DG} \leq \Delta P_{ref,i}^{DG}(k+n-1|k) \leq \Delta \overline{P}_{ref,i}^{DG}, \forall i \in N \quad (30)$$

$$\Delta \underline{Q}_{ref,i}^{DG} \leq \Delta Q_{ref,i}^{DG}(k+n-1|k) \leq \Delta \overline{Q}_{ref,i}^{DG}, \forall i \in N \quad (31)$$

$$\Delta \underline{P}_{ref,i}^{ES} \leq \Delta P_{ref,i}^{ES}(k+n-1|k) \leq \Delta \overline{P}_{ref,i}^{ES}, \forall i- \in N \quad (32)$$

$$\Delta \underline{u}_{SVC,i} \leq \Delta u_{SVC,i}(k+n-1|k) \leq \Delta \overline{u}_{SVC,i}, \forall i \in N \quad (33)$$

$$\Delta V_i(k+n|k) = \sum_{j\in N} \left\{ \frac{\partial V_i}{\partial P_j^b} \Delta P_j^b(k+n|k) + \frac{\partial V_i}{\partial Q_j^b} \Delta Q_j^b(k+n|k) \right\}, \quad (34)$$

$$\forall i, j \in N$$

Formula (30) and formula (31) represent an active power regulation quantity constraint and a reactive power regulation quantity constraint of distributed new energy respectively, $\Delta P_{ref,i}^{DG}(k+n-1|k)$ and $\Delta Q_{ref,i}^{DG}(k+n-1|k)$ represent an active power regulation quantity and a reactive power regulation quantity of an $i^{th}$ distributed new energy at the time (k+n−1) respectively, $\Delta \overline{P}_{ref,i}^{DG}$ and $\Delta \underline{P}_{ref,i}^{DG}$ are an upper limit and a lower limit of the active power regulation quantity of the $i^{th}$ distributed new energy respectively, and $\Delta \overline{Q}_{ref,i}^{DG}$ and $\Delta \underline{Q}_{ref,i}^{DG}$ are an upper limit and a lower limit of the reactive power regulation quantity of the $i^{th}$ distributed new energy respectively;

Formula (32) and formula (33) represent an active power regulation quantity constraint of energy storage and a reactive power regulation quantity constraint of SVCs respectively, $\Delta P_{ref,i}^{ES}(k+n-1|k)$ and $\Delta u_{SVC,i}(k+n-1|k)$ are an active power regulation quantity of $i^{th}$ energy storage and a control variation of the $i^{th}$ SVC at the time (k+n−1) respectively, $\Delta \overline{P}_{ref,i}^{ES}$ and $\Delta \underline{P}_{ref,i}^{ES}$ are an upper limit and a lower limit of the active power regulation quantity of the $i^{th}$ energy storage respectively, and $\Delta \overline{u}_{SVC,i}$ and $\Delta \underline{u}_{SVC,i}$ are an upper limit and a lower limit of the control variation of the $i^{th}$ SVC respectively;

Formula (34) indicates a relationship between voltage and injection power of nodes of the active power distribution network, $\Delta P_j^b(k+n|k)$ and $\Delta Q_j^b(k+n|k)$ are an injected active power variation and an injected reactive power variation of the $j^{th}$ node at the time (k+n) respectively, and $$\frac{\partial V_i}{\partial P_j^b} \text{ and } \frac{\partial V_i}{\partial Q_j^b}$$

are variation coefficients of a voltage of the $i^{th}$ node with respect to an injected active power and an injected reactive power of the $j^{th}$ node respectively; N is a set of the nodes of the active power distribution network.

Further, the source-storage-load multi-terminal collaboration-based distributed voltage control model is established based on the objective function (29) and constraints (30)-(34) of the nodes, and is specifically expressed as:

$$\mathcal{J}_i(k) = \sum_{i=1}^{M} \varphi_i J_i(u_1^{p-1}, \ldots, u_{i-1}^{p-1}, u_i^p, u_{i+1}^{p-1} \ldots, u_M^{p-1}) \quad (35)$$

In formula (35), $\varphi_i$ is a weight coefficient of the objective function of the $i^{th}$ node, M represents the number of the nodes of the active power distribution network, $u_i^p$ is a value of the control variable of the $i^{th}$ node during iteration p, and $u_{j-1}^{p-1}$, j≠i, j∈{1,2, ..., M} represents a value of the control variable of the $j^{th}$ node during iteration (p−1); and similarly, formula (35) meets constraints (30)-(34).

Step 5: the source-storage-load multi-terminal collaboration-based distributed voltage control takes into account the problems of voltage magnitude being out of limit and voltage leap, an optimal control sequence of the source terminal, the load terminal and the storage terminal is solved online in a receding horizon, and power regulation quantities of the source terminal, the load terminal and the storage terminal are allocated according to the optimal control sequence.

The optimal control sequence of the source terminal, the load terminal and the storage terminal is solved online through the following steps:

Step 1: whether ETF in (28) is triggered at the time k is determined; if so, Step 2 is performed; otherwise, k=k+1, and Step 1 is performed again;

Step 2: a convergence threshold $\epsilon$, a maximum number of iterations $\overline{p}(k)$, a number of iterations p=1 are initialized, and Step 3 is performed;

Step 3: whether a 2-norm $|u_i^p - u_i^{p-1}|_2$ of the control variable during two iterations is greater than the convergence threshold $\epsilon$ and whether the number of iterations p is less than $\overline{p}(k)$ are determined; if so, Step 4 is performed; otherwise, Step 5 is performed;

Step 4: the objective function (35) of the source-storage-load multi-terminal collaboration-based distributed voltage control model is solved to obtain an optimization control sequence ur, in which p=p+1; $u_i^p$ is updated by formula (36); Step 3 is performed;

$$u_i^p = \varphi_i u_i^{p,*} + (1-\varphi_i) u_i^{p-1} \quad (36)$$

Step 5: a control variable at an initial position of $u_i^p$ is issued to the distributed new energy inverter, the energy storage inverter and the SVC inverter, where k=k+1; and Step 1 is performed.

It should be noted that a long-timescale control method and a short-timescale control method provided by the invention may be used separately or together. When the long-timescale control method and the short-timescale control method are used together for regulation, the voltage regulation capacity is higher.

Figure 8:
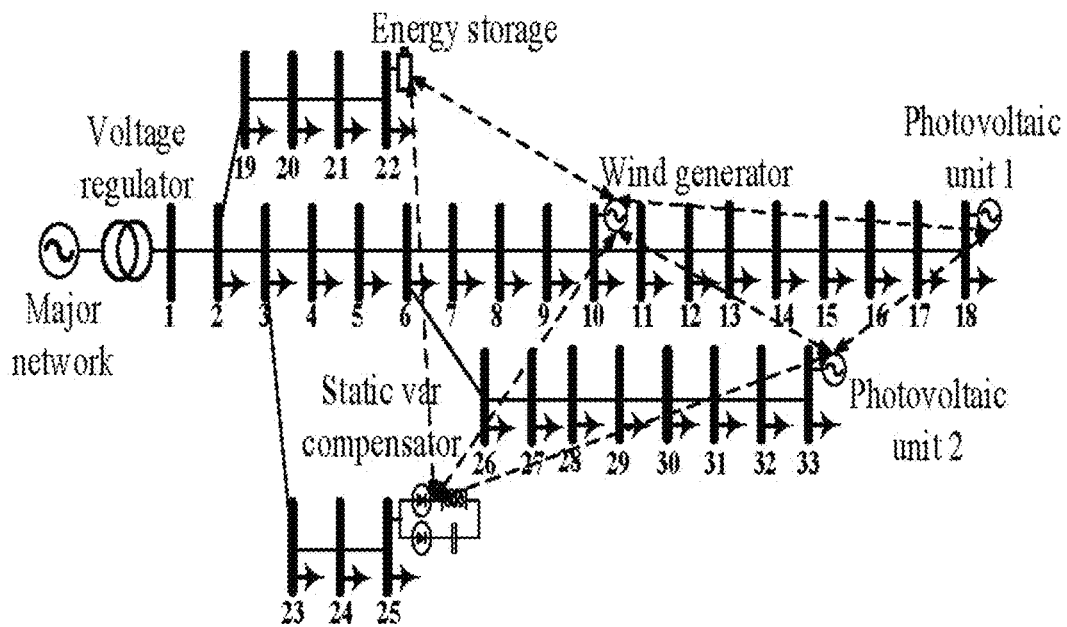

In the invention, a corresponding simulation experiment is carried out based on an IEEE 33 Bus simulation system shown in FIG. 8, wherein the voltage regulator is located on Bus 1, a power generator is located at Bus 10, photovoltaic units are located on Nus 18 and Bus 33, energy storage is located on Bus 22, SVC is located on Bus 25, the rated voltage of the system is 10 kV, the safety range of the voltage magnitude is [0.95,1.05]p.u., the safety range of the change of the voltage magnitude is [−0.01,0.01]p.u., a permissible error is $10^{-3}$p.u., a cycle of the mode switching control is 15 min, a cycle of the source-storage-load multi-terminal collaboration-based distributed voltage control is 1 s, the regulation range of the voltage regulator is ±5×1% p.u., other parameters of the simulation system are identical with those of a standard IEEE 33 Bus system, and operating modes of the system are described in Table 1.

TABLE 1

Operating mode

| Discrete place | Description |
| --- | --- |
| $P_1$ | Operating mode when taps of the voltage regulator are in a −5% p.u. position |
| $P_2$ | Operating mode when taps of the voltage regulator are in a −4% p.u. position |
| $P_3$ | Operating mode when taps of the voltage regulator are in a −3% p.u. position |
| $P_4$ | Operating mode when taps of the voltage regulator are in a −2% p.u. position |
| $P_5$ | Operating mode when taps of the voltage regulator are in a −1% p.u. position |
| $P_6$ | Operating mode when taps of the voltage regulator are in a 0% p.u. position |
| $P_7$ | Operating mode when taps of the voltage regulator are in a 1% p.u. position |
| $P_8$ | Operating mode when taps of the voltage regulator are in a 2% p.u. position |
| $P_9$ | Operating mode when taps of the voltage regulator are in a 3% p.u. position |
| $P_{10}$ | Operating mode when taps of the voltage regulator are in a 4% p.u. position |
| $P_{11}$ | Operating mode when taps of the voltage regulator are in a 5% p.u. position |

Figure 9A:
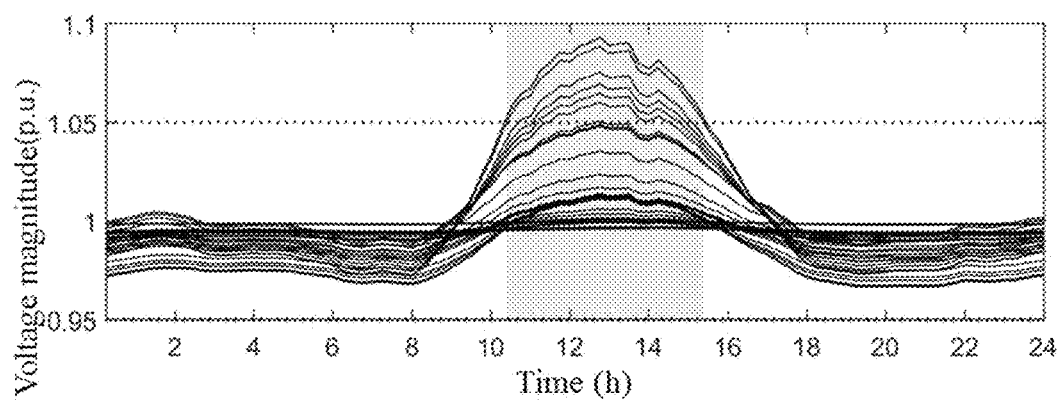
FIG. 9A illustrates a voltage magnitude simulation result obtained without a control method according to one embodiment of the invention.
Figure 9B:
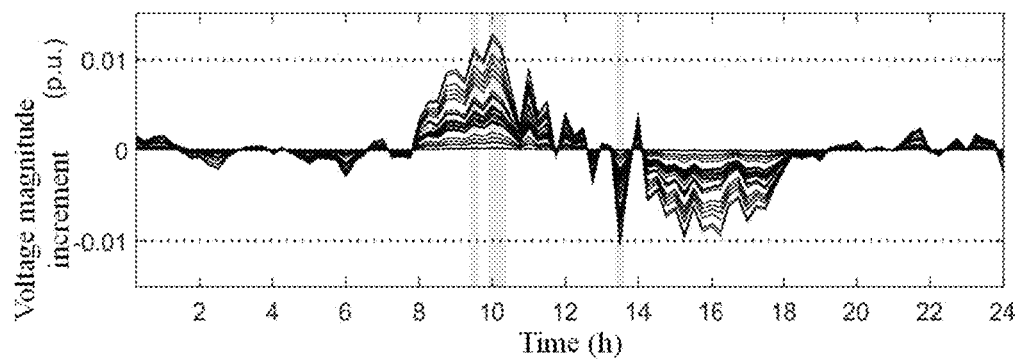
FIG. 9B illustrates a voltage magnitude increment simulation result obtained without a control method according to one embodiment of the invention.

As can be known with reference to FIG. 9A and FIG. 9B which illustrate the Bus voltage magnitude simulation result and the voltage magnitude increment simulation result obtained without any control method, the situation of Bus voltage magnitude being out of limit and the situation of voltage leap are avoided (as shown by the selected areas in FIG. 9A and FIG. 9B).

Figure 10A:
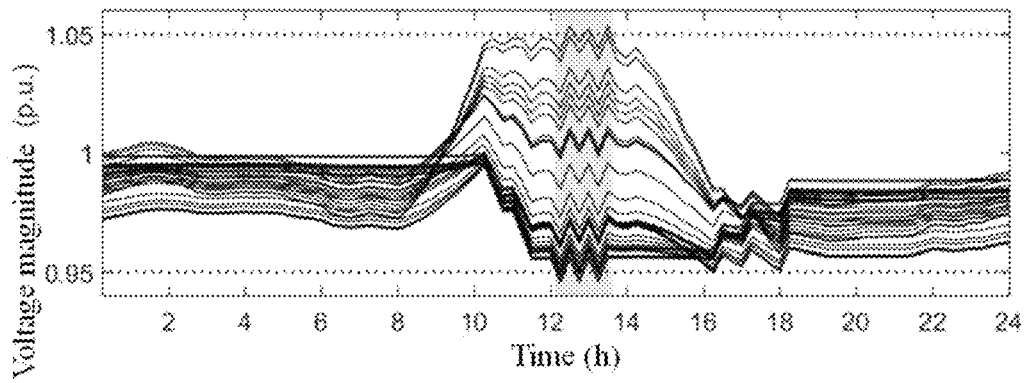
FIG. 10A illustrates a voltage magnitude simulation result obtained by using a voltage regulator for control according to one embodiment of the invention.
Figure 10B:
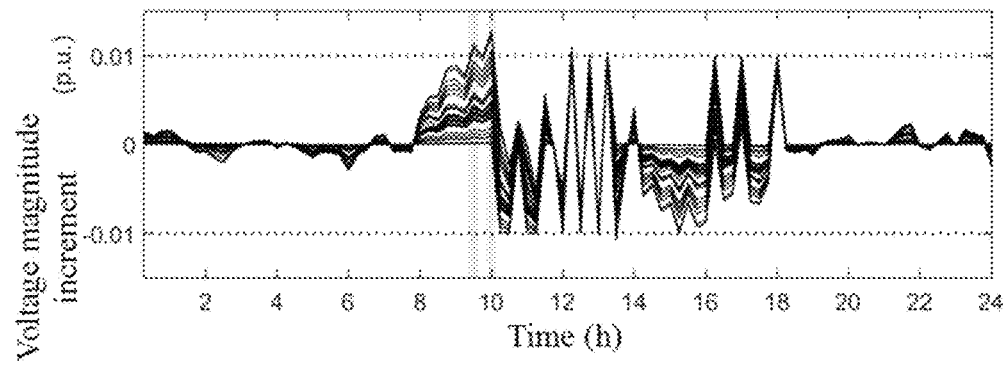
FIG. 10B illustrates a voltage magnitude increment simulation result obtained by using the voltage regulator for control according to one embodiment of the invention.
Figure 10C:
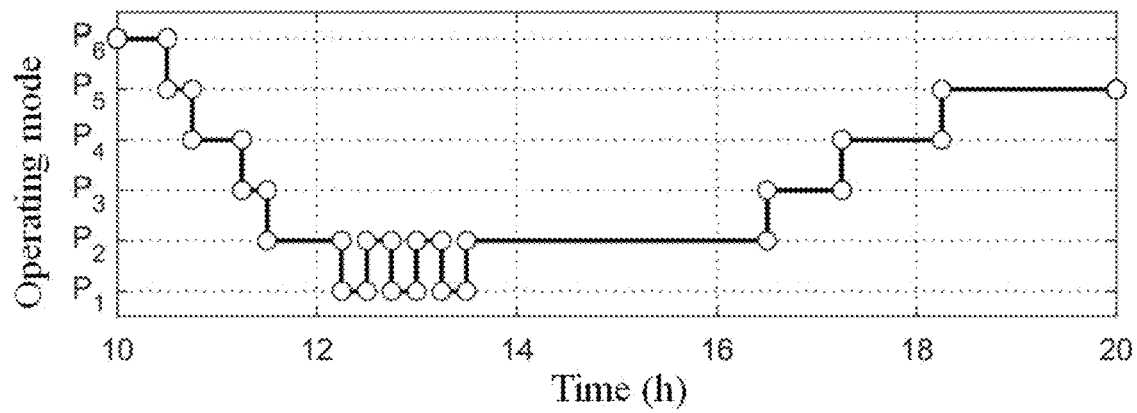
FIG. 10C illustrates an operating mode simulation result obtained by using the voltage regulator for control according to one embodiment of the invention.

As can be known with reference to FIG. 10A-FIG. 10C which illustrate simulation results of voltage regulation through a voltage regulator, compared with the simulation results in FIG. 9A and FIG. 9B, the situation of Bus voltage magnitude being out of limit and the situation of voltage leap are improved, but the situation of Bus voltage magnitude being out of limit still exists in the selected area in FIG. 10B. As can be known with reference to FIG. 10C which illustrates mode switching based on voltage security event trigger, the voltage security trigger mechanism designed in the invention can accurately trigger mode switching of the system.

Figure 11A:
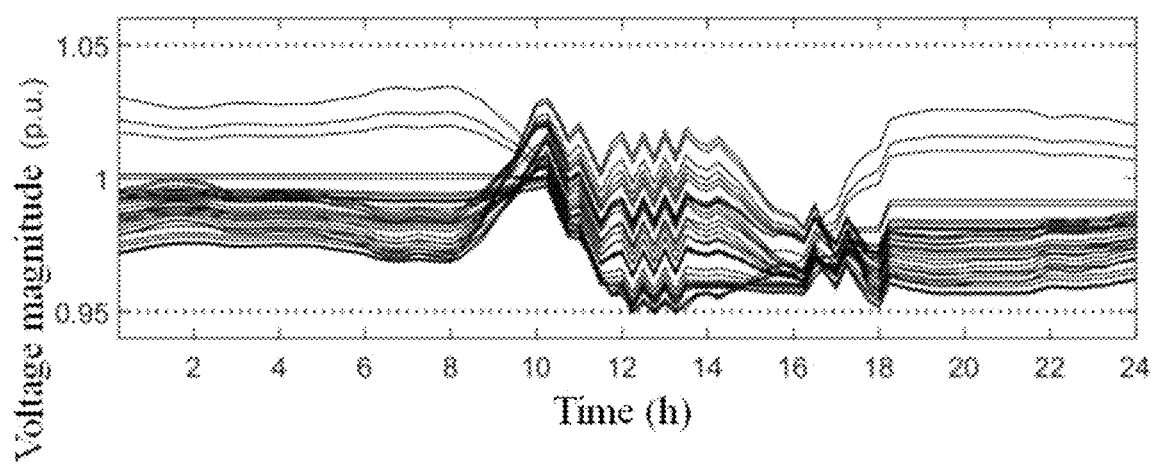
FIG. 11A illustrates a voltage magnitude simulation result obtained by using the method provided by one embodiment of the invention.
Figure 11B:
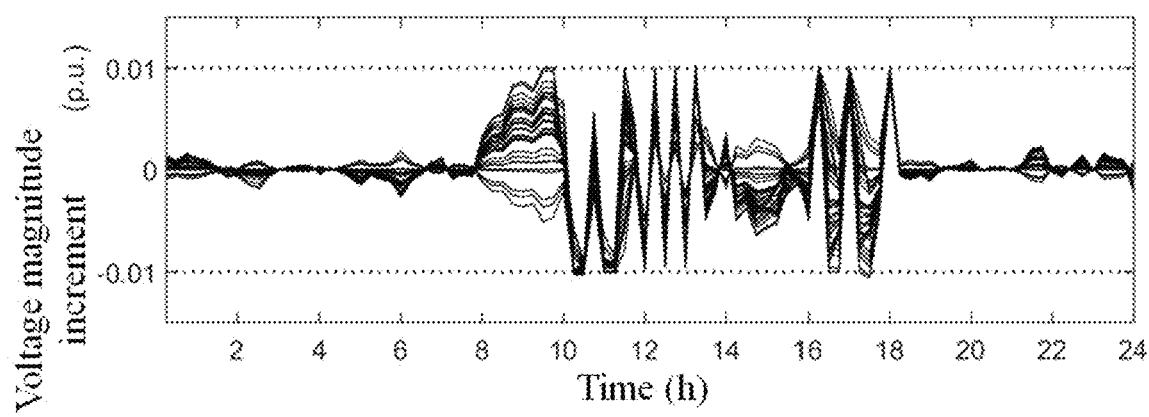
FIG. 11B illustrates a voltage magnitude increment simulation result obtained by using the method provided by one embodiment of the invention.
Figure 11C:
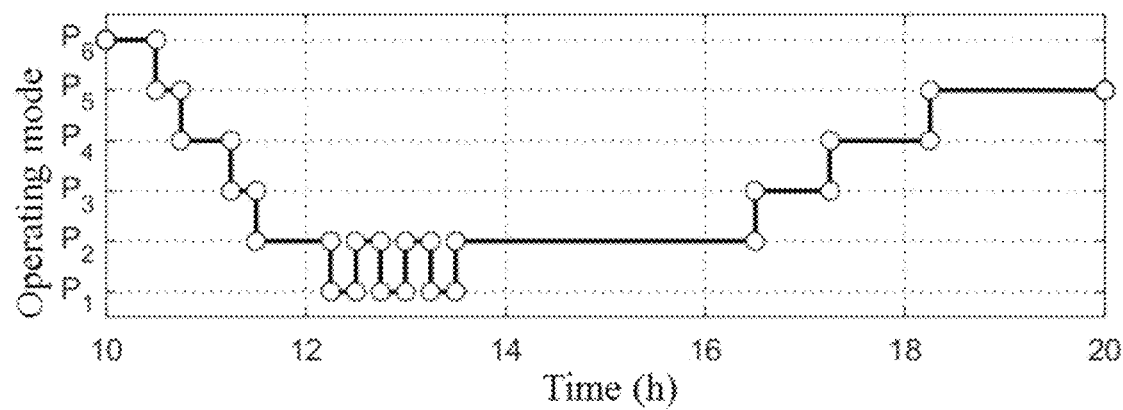
FIG. 11C illustrates an operating mode simulation result obtained by using the method provided by one embodiment of the invention.

As can be known with reference to FIG. 11A, FIG. 11B and FIG. 11C which illustrate simulation results obtained through the method provided by the invention, the problems of Bus voltage magnitude being out of limit and voltage leap can be effectively solved, and the Bus voltage can be smoothened in the whole simulation cycle, thus guaranteeing the security and economy of system operation. As shown in FIG. 11C, the switch result obtained through the voltage security event trigger mechanism designed in the invention is identical with the result in FIG. 10C, which means that the voltage security event trigger mechanism can accurately trigger mode switching of the system.

Therefore, the method provided by the invention guarantees the overall economy of the system under the precondition of ensuring the security of the active power distribution network, solves many voltage problems of the active power distribution network, and has a high response speed, a good voltage control effect and certain practical engineering significance.

The above embodiments are merely preferred ones of the invention. It should be noted that various improvements and transformations may be made by those ordinarily skilled in the art without departing from the technical principle of the invention, and all these improvements and transformations should fall within the protection scope of the invention.

What is claimed is:

1. A long-timescale voltage regulation method based on source-grid-load-storage multi-terminal collaboration of a power distribution network, comprising:
   acquiring a multi-mode switching control model based on voltage security event trigger of feeders of an active power distribution network; and
   establishing multi-objective optimization taking into account a source-storage-load regulation cost and a network transmission loss in each operating mode according to the multi-mode switching control model based on voltage security event trigger, to obtain optimal power values of a source terminal, a load terminal and a storage terminal over a long timescale;
   wherein a construction process of the multi-mode switching control model based on voltage security event trigger comprises:
   establishing the multi-mode switching control model, which is composed of a septimal tuple (P, T, A, F_, F_+, $T_M$, $M_0$), of the feeders of the active power distribution network based on a Petri network, where:

$$P=\{P_1, P_2, \ldots, P_n\},$$

$$T=\{T_1, T_2, \ldots, T_{2n-2}\},$$

$$A=(P \otimes T) \cup (T \otimes P),$$

$$T_M=\{\Delta T_1, \Delta T_2, \ldots, \Delta T_{2n-2}\} \quad (1)$$

in formula (1), P is a set of discrete places, and $P_i$, i∈{1,2, . . . n} is discrete places and represents operating modes of the active power distribution network; n is a total number of voltage regulator taps; T is a set of all discrete transitions; A is a set of all arcs, the modes are connected to the corresponding transitions through the directed arcs in A, and these directed arcs are associated with predecessor arcs defined in F_ or successor arcs defined in F_+ respectively, and ⊗ is a Cartesian product; F_ is a set of the predecessor arcs; F_+ is a set of the successor arcs; $T_M$ represents a set of discrete transition switching times; $M_0$ represents a set of all initial mode marks;
   the discrete transition $T_i$, i∈{1,2,2n−2} is triggered by a voltage security event designed as follows:
   if $t=t_0$ and $V_{rm}(t)$ falls to $$V_{rm}(t) < V_{ref} - \frac{V_{db}}{2},$$

$$\text{ETSC}(T_i)=S(t-t_0)-S(t-t_0-\Delta T_i), \ i \in \{1,2, \ldots n-1\} \quad (2)$$

if t=t₀ and $V_{rm}(t)$ rises to $$V_{rm}(t) > V_{ref} + \frac{V_{db}}{2},$$

$$\text{ETSC}(T_i) = S(t-t_0) - S(t-t_0-\Delta T_{n-2+i}), i \in \{2,3, \ldots n-1\} \quad (3)$$

formula (2) indicates that the discrete transition $T_i$, i=1, 2,n−1 is triggered when $V_{rm}(t)$ falls to a lower threshold $$V_{ref} - \frac{V_{db}}{2}$$

and $DT_i$ time later, the operating mode is switched from $P_i$ to $P_{i+1}$; formula (3) indicates that $T_{n-2+i}$, i=2,3,L n is triggered when $V_{rm}(t)$ rises to an upper threshold $$V_{ref} + \frac{V_{db}}{2} \text{ and } DT_{n-2+i}$$

time later, the operating mode is switched from $P_i$ to $P_{i-1}$; where, ETSC($T_i$) is a trigger function of the discrete transition $T_i$, $V_{ref}$ a voltage reference value, $V_{db}$ is a voltage error dead zone, and $V_{rm}(t)$ is a moving average of a secondary voltage of a voltage regulator, which is specifically expressed as:

$$V_{rm}(t) = \begin{cases} \sum_{\tau=1}^{t} V(\tau)/t, t \leq N \\ \sum_{\tau=t-N+1}^{t} V(\tau)/N, t > N \end{cases} \quad (4)$$

in formula (4), N is a length of a sliding time window, $V(\tau)$ is the secondary voltage of the voltage regulator at a time $\tau$, and t represents a present time; in formula (2) and formula (3), a step function $S(t-t_0)$ is expressed as:

$$S(t - t_0) = \begin{cases} 1, & t \geq t_0 \\ 0, & t < t_0 \end{cases} \quad (5)$$

in formula (5), t represents a present time, and $t_0$ represents a certain time;

wherein the method further comprises:
controlling the source terminal, the load terminal, and the storage terminal to reach to the respective optimal power values of the source terminal, the load terminal, and the storage terminal.

2. The long-timescale voltage regulation method based on source-grid-load-storage multi-terminal collaboration of a power distribution network according to claim 1, wherein the multi-objective optimization taking into account the source-storage-load regulation cost and the network transmission loss comprises:

an objective function of the regulation cost, which is specifically expressed as:

$$f_1(t) = \left\{ \sum_{i \in N_d} F_i^d(t) + \sum_{j \in N_e} F_j^e(t) + \sum_{l \in N_s} F_l^s(t) \right\} \quad (6)$$

in formula (6), $F_i^d(t)$, $F_j^e(t)$ and $F_l^s(t)$ represent an operating return of $i^{th}$ distributed new energy, an operating cost of $j^{th}$ energy storage, and an operating cost of an $l^{th}$ SVC at the time t respectively; $N_d$, $N_e$ and $N_s$ represent a set of distributed new energy, a set of energy storage and a set of SVCs respectively; $F_i^d(t)$, $F_j^e(t)$ and $F_l^s(t)$ are expressed by the following quadratic functions:

$$\begin{cases} F_i^d(t) = \frac{1}{2}\alpha_1^d P_i^{DG}(t)^2 + \alpha_2^d P_i^{DG}(t) + \alpha_3^d, \forall i \in \mathcal{N}_d \\ F_j^e(t) = \frac{1}{2}\alpha_1^e P_j^{ES}(t)^2 + \alpha_2^e P_j^{ES}(t) + \alpha_3^e, \forall j \in \mathcal{N}_e \\ F_l^s(t) = \frac{1}{2}\alpha_1^s Q_l^{SVC}(t)^2 + \alpha_2^s Q_l^{SVC}(t) + \alpha_3^s, \forall l \in \mathcal{N}_s \end{cases} \quad (7)$$

in formula (7), $a_1^d$, $a_2^d$ and $a_3^d$ are operating return coefficients of the $i^{th}$ distributed new energy, which are all negative values; $a_1^e$, $a_2^e$ and $a_3^e$ are operating cost coefficients of the $j^{th}$ energy storage, which are all positive values; $a_1^s$, $a_2^s$ and $a_3^s$ are operating cost coefficients of the $l^{th}$ SVC, which are all positive values; $P_i^{DG}(t)$, $P_j^{ES}(t)$ and $Q_l^{SVC}(t)$ are an active power output of the $i^{th}$ distributed new energy, an active power output of the $j^{th}$ energy storage and a reactive power output of the $l^{th}$ SVC at the time t respectively;

an objective function of the network transmission loss, which is specifically expressed as:

$$f_2(t) = \sum_{i \in N} \left\{ \frac{P_i^b(t)^2 + Q_i^b(t)^2}{V_i(t)^2}(R_i + X_i) \right\} \quad (8)$$

in formula (8), $P_i^b(t)$ and $Q_i^b(t)$ are an injected active power and an injected reactive power of an $i^{th}$ node at the time t respectively; $R_i$ and $X_i$ are a resistance and a reactance of a branch circuit connected to the $i^{th}$ node respectively; $V_i(t)$ is a voltage of the $i^{th}$ node at the time t; N is a set of all nodes;

the multi-objective optimization is composed of formula (6) and formula (8), and is specifically expressed as:

$$\min\{\lambda_1 f_1(t) + \lambda_2 f_2(t)\} \quad (9)$$

in formula (9), $\lambda_1$ and $\lambda_2$ are weight factors of $f_1(t)$ and $f_2(t)$ respectively, and formula (9) meets the following constraints:

$$\underline{P}_i^{DG} \leq P_i^{DG}(t) \leq \overline{P}_i^{DG}, \forall i \in \mathcal{N}_d \quad (10)$$

$$\underline{P}_i^{ES} \leq P_i^{ES}(t) \leq \overline{P}_i^{ES}, \forall i \in \mathcal{N}_e \quad (11)$$

$$\underline{Q}_i^{SVC} \leq Q_i^{SVC}(t) \leq \overline{Q}_i^{SVC}, \forall i \in \mathcal{N}_s \quad (12)$$

$$|Q_{DG,i}(t)| \leq \sqrt{S_i^{DG2} - P_i^{DG}(t)^2}, \forall i \in \mathcal{N}_d \quad (13)$$

$$\Delta \underline{P}_i^{DG} \leq \Delta P_i^{DG}(t) \leq \Delta \overline{P}_i^{DG}, \forall i \in \mathcal{N}_d \quad (14)$$

$$\Delta \underline{P}_i^{ES} \leq \Delta P_i^{ES}(t) \leq \Delta \overline{P}_i^{ES}, \forall i \in \mathcal{N}_e \quad (15)$$

$$\Delta \underline{Q}_i^{DG} \leq \Delta Q_i^{DG}(t) \leq \Delta \overline{Q}_i^{DG}, \forall i \in \mathcal{N}_d \quad (16)$$

$$\Delta \underline{Q}_i^{SVC} \leq \Delta Q_i^{SVC}(t) \leq \Delta \overline{Q}_i^{SVC}, \forall i \in \mathcal{N}_e \quad (17)$$

$$P_{i+1}^b(t) = P_i^b(t) - P_i^{loss}(t) + \sum_{j \in N_{d,i}} P_j^{DG}(t) + \sum_{i \in N_{e,i}} P_i^{ES}(t) - P_{i+1}^L(t), \quad (18)$$

$$\forall i \in N$$

-continued $$Q_{i+1}^b(t) = Q_i^b(t) - Q_i^{loss}(t) + \sum_{j \in N_{d,i}} Q_j^{DG}(t) - \sum_{l \in N_{s,i}} Q_l^{SVC}(t), \quad (19)$$

$$\forall i \in N$$

$$\underline{SOC_i} \leq SOC_i(t) = \tag{20}$$

$$SOC_i(t-1) + \delta_i(t) \frac{\int P_i^{ES}(t)}{\eta_i^d} - (1-\delta_i(t))\eta_i^c \int P_i^{ES}(t) \leq \overline{SOC_i},$$

$$\forall i \in N_e$$

$$\sum_{j \in N_d} P_j^{DG}(t) + \sum_{l \in N_e} P_l^{ES}(t) - \sum_{i \in N} P_i^{loss}(t) = \sum_{i \in N} P_i^L(t) \tag{21}$$

formula (10) and formula (11) represent upper and lower limit constrains of an active power of the distributed new energy and the energy storage respectively, $P_i^{DG}(t)$ and $P_i^{ES}(t)$ are the active power output of $i^{th}$ distributed new energy and the active power output of the $i^{th}$ energy storage at the time t respectively, $\overline{P}_i^{DG}$ and $\underline{P}_i^{DG}$ are an upper limit and a lower limit of the active power of the $i^{th}$ distributed new energy respectively, and $\overline{P}_i^{ES}$ and $\underline{P}_i^{ES}$ are an upper limit and a lower limit of the active power of the $i^{th}$ energy storage respectively;

formula (12) and formula (13) represents upper and lower limit constraints of a reactive power of the SVGs and the distributed new energy respectively, $Q_i^{SVC}(t)$ and $Q_{DG,i}(t)$ are the reactive power output of the $i^{th}$ SVG and the reactive power output of the $i^{th}$ distributed new energy at the time t respectively, $\overline{Q}_i^{SVC}$ and $\underline{Q}_i^{SVC}$ are an upper limit and a lower limit of the reactive power of the $i^{th}$ SVG respectively, and $S_i^{DG}$ is a capacity of the $i^{th}$ distributed new energy;

formula (14) and formula (15) represent active power ramp constraints of the distributed new energy and the energy storage respectively, $\Delta P_i^{DG}(t)=P_i^{DG}(t)-P_i^{DG}(t-1)$ and $\Delta P_i^{ES}(t)=P_i^{ES}(t)-P_i^{ES}(t-1)$ are variations of the active power output of the $i^{th}$ distributed new energy and the active power output of the $i^{th}$ energy storage at the time t respectively, $\Delta \overline{P}_i^{DG}$ and $\Delta \underline{P}_i^{DG}$ are an upper limit and a lower limit of an active power ramp of the $i^{th}$ distributed new energy respectively, and $\Delta \overline{P}_i^{ES}$ and $\Delta \underline{P}_i^{ES}$ are an upper limit and a lower limit of an active power ramp of the $i^{th}$ energy storage respectively;

formula (16) and formula (17) are reactive power ramp constraints of the distributed new energy and the SVCs respectively, $\Delta Q_i^{DG}(t)=Q_i^{DG}(t)-Q_i^{DG}(t-1)$ and $\Delta Q_i^{SVC}(t)=Q_i^{SVC}(t)-Q_i^{SVC}(t-1)$ are variations of the reactive power output of the $i^{th}$ distributed new energy and the reactive power output of the $i^{th}$ SVC at the time t respectively, and $\Delta \overline{Q}_i^{DG}$ and $\Delta \underline{Q}_i^{DG}$ are an upper limit and a lower limit of a reactive power ramp of the $i^{th}$ distributed new energy respectively, and $\Delta \overline{Q}_i^{SVC}$ and $\Delta \underline{Q}_i^{SVC}$ are an upper limit and a lower limit of a reactive power ramp of the $i^{th}$ SVC respectively;

formula (18) and formula (19) are an active power balance constraint and a reactive power balance constraint of adjacent nodes respectively, $P_i^b(t)$ and $Q_i^b(t)$ are the injected active power and the injected reactive power of the $i^{th}$ node at the time t respectively, $P_{i+1}^b(t)$ and $Q_{i+1}^b(t)$ are an injected active power and an injected reactive power of a $(i+1)^{th}$ node at the time t respectively, $P_i^{loss}(t)$ and $Q_i^{loss}(t)$ are an active power loss and a reactive power loss of the $i^{th}$ node at the time t respectively, $P_j^{DG}(t)$ and $Q_j^{DG}(t)$ are an active power output of the $j^{th}$ distributed new energy and an active power output the $j^{th}$ energy storage at the time t respectively, $N_{d,i}$ is a set of distributed new energy located at the $i^{th}$ node, $P_l^{ES}(t)$ and $Q_l^{SVC}(t)$ are an active power output of an $l^{th}$ energy storage and a reactive power output of an $l^{th}$ energy SVG at the time t respectively, $N_{e,i}$ and $N_{s,i}$ are a set of energy storage located at the $i^{th}$ node and a set of SVGs located at the $i^{th}$ node respectively, and $P_{i+1}^L(t)$ is an active power consumed by loads at the (i+1)th node at the time t;

formula (20) is an SOC constraint of the energy storage, $SOC_i(t)$ is an SOC of the $i^{th}$ energy storage at the time t, $\overline{SOC_i}$ and $\underline{SOC_i}$ are an upper limit and a lower limit of the SOC of the $i^{th}$ energy storage respectively, $\delta_i(t)$ is a charge-discharge coefficient of the $i^{th}$ energy storage at the time t, $\delta_i(t)=1$ is discharge of the energy storage, $\delta_i(t)=0$ is charge of the energy storage, and $\eta_i^d$ and $\eta_i^c$ are charge efficiency and discharge efficiency of the $i^{th}$ energy storage respectively;

formula (21) is an active power balance constraint of a system.

3. The long-timescale voltage regulation method based on source-grid-load-storage multi-terminal collaboration of a power distribution network according to claim 1, further comprising: acquiring a source-storage-load multi-terminal collaboration-based power coordinated control model;
obtaining a source-storage-load multi-terminal collaboration-based distributed voltage control model based on voltage security event trigger according to the source-storage-load multi-terminal collaboration-based power coordinated control model; and
solving the source-storage-load multi-terminal collaboration-based distributed voltage control model based on voltage security event trigger in a receding horizon to obtain an optimal power control sequence of a source terminal, a load terminal and a storage terminal over a short timescale.

4. The long-timescale voltage regulation method based on source-grid-load-storage multi-terminal collaboration of a power distribution network according to claim 3, wherein the source-storage-load multi-terminal collaboration-based power coordinated control model comprises:
an active power model of a distributed new energy inverter, which is established by the following formula:

$$\begin{cases} \Delta i_{od} = \dfrac{1}{1+sT_{in}^p}\left(k_p^p + \dfrac{k_i^p}{s}\right)(\Delta P_{ref}^{DG} - \Delta P_{DG}) \\ \Delta P_{DG} = \dfrac{3u_{od}}{2}\Delta i_{od} \\ \Delta P_{int} = \dfrac{\Delta P_{ref}^{DG} - \Delta P_{DG}}{s} \end{cases} \tag{22}$$

in formula (22), $\Delta P_{ref}^{DG}$ is a difference between an actual reference active power and a current active power of the distributed new energy inverter, $\Delta i_{od}$ is a difference between a d-axis current component at a present time and a d-axis current component at a previous time of the distributed new energy inverter, $T_{in}^p$ is a timeconstant of an inner current loop of an active power of the distributed new energy inverter, $k_p^p$ and $k_i^p$ are a proportion coefficient and an integral coefficient of an outer current loop PI controller respectively, $u_{od}$ is a d-axis component of an output port voltage of the distributed new energy inverter, $\Delta P_{DG}$ is a difference between an output active power at the present time and an output active power at the previous time of the distributed new energy inverter, $\Delta P_{int}$ is an integral of a difference between $\Delta P_{ref}^{DG}$ and $\Delta P_{DG}$, and s is a Laplace operator;

a reactive power model of the distributed new energy inverter, which is obtained in a way similar to formula (22):

$$\begin{cases} \Delta i_{oq} = \dfrac{1}{1+sT_{in}^q}\left(k_p^q + \dfrac{k_i^q}{s}\right)(\Delta Q_{ref}^{DG} - \Delta Q_{DG}) \\ \Delta Q_{DG} = -\dfrac{3u_{od}}{2}\Delta i_{oq} \\ \Delta Q_{int} = \dfrac{\Delta Q_{ref}^{DG} - \Delta Q_{DG}}{s} \end{cases} \quad (23)$$

in formula (23), $\Delta Q_{ref}^{DG}$ is a difference between an actual reference reactive power and a current reactive power of the distributed new energy inverter, $\Delta i_{oq}$ is a difference between a d-axis current component at the present time and a d-axis current component at the previous time of the distributed new energy inverter, $T_{in}^q$ is a time constant of an inner current loop of a reactive power of the distributed new energy inverter, $k_p^q$ and $k_i^q$ are a proportion coefficient and an integral coefficient of an outer current loop PI controller respectively, $u_{od}$ is a d-axis component of an output port voltage of the distributed new energy inverter, $\Delta Q_{DG}$ is a difference between an output reactive power at the present time and an output reactive power at the previous time of the distributed new energy inverter, and $\Delta Q_{int}$ is an integral of a difference between $\Delta Q_{ref}^{DG}$ and $\Delta Q_{DG}$;

an active power model of an energy storage inverter, which is established by the following formula:

$$\begin{cases} \Delta i_L = \dfrac{1}{1+sT_{in}^d}\left(k_p^d + \dfrac{k_i^d}{s}\right)(\Delta P_{ref}^{ES} - \Delta P_{ES}) \\ \Delta P_{ES} = U_{ES}\Delta i_L \\ \Delta P_{int}^d = \dfrac{\Delta P_{ref}^{ES} - \Delta P_{ES}}{s} \end{cases} \quad (24)$$

in formula (24), $\Delta P_{ref}^{ES}$ is a difference between an actual reference power and a current power of the energy storage inverter, $\Delta i_L$ is a difference between a port output current at a present time and a port output current of a previous time of the energy storage inverter, $T_{in}^d$ is a time constant of an inner current loop of an active power of the energy storage inverter, $k_p^d$ and $k_i^d$ are a proportion coefficient and an integral coefficient of an outer current loop PI controller respectively, $U_{ES}$ is an output port voltage of the energy storage inverter, $\Delta P_{ES}$ is a difference between an output power at the present time and an output power at the previous time of the energy storage inverter, and $\Delta P_{int}^d$ is an integral of a difference between $\Delta P_{ref}^{ES}$ and $\Delta P_{ES}$;

a reactive power model of an SVC inverter, which is established by the following formula:

$$\begin{cases} \Delta B_{SVC} = \dfrac{1}{1+sT_{SVC}}\Delta u_{SVC} \\ \Delta Q_{SVC} = \Delta B_{SVC} U_{SVC}^2 \end{cases} \quad (25)$$

in formula (25), $\Delta B_{SVC}$ is a difference between a current value and a value at a previous time of an equivalent susceptance of the SVC inverter, $T_{SVC}$ is a time constant of a control loop of the SVC inverter, $\Delta u_{SVC}$ is a difference between a current value and a value at the previous time of a control variable of the SVC inverter, $U_{SVC}$ is an output port voltage of the SVC inverter, and $\Delta Q_{SVC}$ is a difference between an output power at a present time and an output power at the previous time of the SVC inverter;

the source-storage-load multi-terminal collaboration-based power coordinated control model is established based on formula (22), formula (23), formula (24) and formula (25), and is specifically expressed as:

$$\dot{x}_c = A_c x_c + B_c u_c \quad (26)$$

where, $x_c = \left[\Delta x_c^{pT}, \Delta x_c^{qT}, \Delta x_c^{dT}, \Delta x_c^{sT}\right]^T,$ $u_c = \left[\Delta P_{ref}^{DG^T}, \Delta Q_{ref}^{DG^T}, \Delta P_{ref}^{ES^T}, \Delta u_{SVC}^T\right]^T,$ $A_c = \text{diag}(A_c^p, A_c^q, A_c^d, A_c^s),\ B_c = \text{diag}(B_c^p, B_c^q, B_c^d, B_c^s),$ $\Delta x_c^p = [\Delta P_{DG}, \Delta P_{int}, \Delta i_{od}]^T,\ \Delta x_c^q = [\Delta Q_{DG}, \Delta Q_{int}, \Delta i_{oq}]^T,$ $\Delta x_c^d = [\Delta P_{ES}, \Delta P_{int}^d, \Delta i_L]^T,\ \Delta x_c^s = [\Delta Q_{SVC}]^T,$ $A_c^p = \begin{bmatrix} 0 & 0 & \frac{3}{2}u_{od} \\ -1 & 0 & 0 \\ -\frac{k_p^p}{T_{in}^p} & \frac{k_i^p}{T_{in}^p} & -\frac{1}{T_{in}^p} \end{bmatrix}, A_c^q = \begin{bmatrix} 0 & 0 & -\frac{3}{2}u_{od} \\ -1 & 0 & 0 \\ -\frac{k_p^q}{T_{in}^q} & \frac{k_i^q}{T_{in}^q} & -\frac{1}{T_{in}^q} \end{bmatrix},$ $A_c^d = \begin{bmatrix} 0 & 0 & U_{ES} \\ -1 & 0 & 0 \\ -\frac{k_p^d}{T_{in}^d} & \frac{k_i^d}{T_{in}^d} & -\frac{1}{T_{in}^d} \end{bmatrix}, A_c^e = \left[-\frac{1}{T_{SVC}}\right],$ $B_c^p = \begin{bmatrix} 0 \\ 1 \\ \frac{k_p^p}{T_{in}^p} \end{bmatrix}, B_c^q = \begin{bmatrix} 0 \\ 1 \\ \frac{k_p^q}{T_{in}^q} \end{bmatrix}, B_c^d = \begin{bmatrix} 0 \\ 1 \\ \frac{k_p^d}{T_{in}^d} \end{bmatrix}, B_c^s = \left[\frac{U_{SVC}^c}{T_{SVC}}\right];$ where, diag is a matrix diagonalization operation;

formula (26) is discretized to obtain a mathematical model of the output active power of the inverter in a discrete time:

$$x(k+1) = Ax(k) + Bu(k) \quad (27)$$

in formula (27), x(k) and u(k) are discretize values of $x_c$ and $u_c$ a time k respectively, $A = e^{A_c T_p}$, $B = \int_0^{T_p} e^{A_c \tau} B_c d\tau$, and $T_p$ is a sampling time.

5. The long-timescale voltage regulation method based on source-grid-load-storage multi-terminal collaboration of a power distribution network according to claim 4, wherein the source-storage-load multi-terminal collaboration-based distributed voltage control model based on voltage security event trigger comprises:

the source-storage-load multi-terminal collaboration-based distributed voltage control network being triggered by a voltage security event designed as follows:

$$ETF = \{|\Delta V_i(k)| > \Delta \overline{V}_i\} OR\{|V_i(k) - V_{ref,i}| > \Delta V_{db,i}\} \quad (28)$$

in formula (28), ETF indicates that the source-storage-load multi-terminal collaboration-based distributed voltage control will be triggered if a voltage leap or voltage magnitude of an $i^{th}$ node at the time k exceeds a threshold; $\Delta V_i(k)=V_i(k)-V_i(k-1)$ represents a voltage leap threshold of the $i^{th}$ node at the time k, $V_i(k)$ represents a voltage magnitude threshold of the $i^{th}$ node at the time k, $V_{ref,i}$ represents a voltage reference value of the $i^{th}$ node, and $\Delta V_{db,i}$ represents a voltage off-limit dead zone of the $i^{th}$ node;

based on formula (27), a control objective function of the source-storage-load multi- terminal collaboration-based distributed voltage control model is designed as:

$$J_i(k) = \sum_{n=1}^{N_p}\left\{\|\Delta V_i(k+n|k) - \Delta \overline{V}_i\|_{S_1}^2 + \|V_i(k+n|k) - V_{ref,i}\|_{S_2}^2 + \|u_i(k+n-1|k)\|_{S_3}^2\right\} \quad (29)$$

in formula (29), $J_i(k)$ represents a control objective function of the $i^{th}$ node; $N_p$ is a predictive step length; $\Delta V_i(k+n|k)$ is a voltage leap at a time (k+n) of the $i^{th}$ node, predicted at the time k; $V_i(k+n|k)$ is a voltage magnitude at the time (k+n) of the $i^{th}$ node, predicted at the time k; $u_i(k+n-1|k)$ is a control variable at a time (k+n−1) of the $i^{th}$ node, of which the specific composition is the same as u(k) in formula (27); $S_1$, $S_2$ and $S_3$ are corresponding weight coefficients;

the control objective function (29) meets the following constraints:

$$\Delta \underline{P}_{ref,i}^{DG} \leq \Delta P_{ref,i}^{DG}(k+n-1|k) \leq \Delta \overline{P}_{ref,i}^{DG}, \forall i \in \mathcal{N} \quad (30)$$

$$\Delta \underline{Q}_{ref,i}^{DG} \leq \Delta Q_{ref,i}^{DG}(k+n-1|k) \leq \Delta \overline{Q}_{ref,i}^{DG}, \forall i \in \mathcal{N} \quad (31)$$

$$\Delta \underline{P}_{ref,i}^{ES} \leq \Delta P_{ref,i}^{ES}(k+n-1|k) \leq \Delta \overline{P}_{ref,i}^{ES}, \forall i \in \mathcal{N} \quad (32)$$

$$\Delta \underline{u}_{SVC,i} \leq \Delta u_{SVC,i}(k+n-1|k) \leq \Delta \overline{u}_{SVC,i}, \forall i \in \mathcal{N} \quad (33)$$

$$\Delta V_i(k+n|k) = \sum_{j\in N}\left\{\frac{\partial V_i}{\partial P_j^b}\Delta P_j^b(k+n|k) + \frac{\partial V_i}{\partial Q_j^b}\Delta Q_j^b(k+n|k)\right\}, \quad (34)$$

$$\forall i, j \in \mathcal{N}$$

formula (30) and formula (31) represent an active power regulation quantity constraint and a reactive power regulation quantity constraint of distributed new energy respectively, $\Delta P_{ref,i}^{DG}(k+n-1|k)$ and $\Delta Q_{ref,i}^{DG}(k+n-1|k)$ represent an active power regulation quantity and a reactive power regulation quantity of an $i^{th}$ distributed new energy at the time (k+n−1) respectively, $\Delta \overline{P}_{ref,i}^{DG}$ and $\Delta \underline{P}_{ref,i}^{DG}$ are an upper limit and a lower limit of the active power regulation quantity of the $i^{th}$ distributed new energy respectively, and $\Delta \overline{Q}_{ref,i}^{DG}$ and $\Delta \underline{Q}_{ref,i}^{DG}$ are an upper limit and a lower limit of the reactive power regulation quantity of the $i^{th}$ distributed new energy respectively;

formula (32) and formula (33) represent an active power regulation quantity constraint of energy storage and a reactive power regulation quantity constraint of SVCs respectively, $\Delta P_{ref,i}^{ES}(k+n-1|k)$ and $\Delta u_{SVC,i}(k+n-1|k)$ are an active power regulation quantity of $i^{th}$ energy storage and a control variation of the $i^{th}$ SVC at the time (k+n−1) respectively, $\Delta \overline{P}_{ref,i}^{ES}$ and $\Delta \underline{P}_{ref,i}^{ES}$ are an upper limit and a lower limit of the active power regulation quantity of the $i^{th}$ energy storage respectively, and $\Delta \overline{u}_{SVC,i}$ and $\Delta \underline{u}_{SVC,i}$ are an upper limit and a lower limit of the control variation of the $i^{th}$ SVC respectively;

formula (34) indicates a relationship between voltage and injection power of nodes of the active power distribution network, $\Delta P_j^b(k+n|k)$ and $\Delta Q_j^b(k+n|k)$ are an injected active power variation and an injected reactive power variation of the $j^{th}$ node at the time (k+n) respectively, and $$\frac{\partial V_i}{\partial P_j^b} \text{ and } \frac{\partial V_i}{\partial Q_j^b}$$

are variation coefficients of a voltage of the $i^{th}$ node with respect to an injected active power and an injected reactive power of the $j^{th}$ node respectively; N is a set of the nodes of the active power distribution network;

the source-storage-load multi-terminal collaboration-based distributed voltage control model is established based on the objective function (29) and constraints (30)-(34) of the nodes, and is specifically expressed as:

$$F_i(k) = \sum_{i=1}^{M}\varphi_i J_i\left(u_1^{p-1}, \ldots, u_{i-1}^{p-1}, u_i^p, u_{i+1}^{p-1}, \ldots, u_M^{p-1}\right) \quad (35)$$

in formula (35), $\varphi_i$ is a weight coefficient of the objective function of the $i^{th}$ node, M represents the number of the nodes of the active power distribution network, $u_i^p$ is a value of the control variable of the $i^{th}$ node during iteration p, and $u_{j-1}^{p-1}$, j≠i, j∈{1,2, ..., M} represents a value of the control variable of the $j^{th}$ node during iteration (p−1); and similarly, formula (35) meets constraints (30)-(34).

6. The long-timescale voltage regulation method based on source-grid-load-storage multi-terminal collaboration of a power distribution network according to claim 5, wherein solving the source-storage-load multi-terminal collaboration-based distributed voltage control model based on voltage security event trigger in a receding horizon to obtain an optimal power control sequence of a source terminal, a load terminal and a storage terminal, comprises:

Step 1: determining whether ETF in (28) is triggered at the time k; if so, performing Step 2; otherwise, letting k=k+1, and performing Step 1 again;

Step 2: initializing a convergence threshold ϵ, a maximum number of iterations $\bar{p}(k)$, a number of iterations p=1, and performing Step 3;

Step 3: determining whether a 2-norm $\|u_i^p - u_i^{p-1}\|_2$ of the control variable during two iterations is greater than the convergence threshold ϵ and whether the number of iterations p is less than $\bar{p}(k)$; if so, performing Step 4; otherwise, performing Step 5;

Step 4: solving the objective function (35) of the source-storage-load multi-terminal collaboration-based distributed voltage control model to obtain an optimization control sequence $u_i^{p,*}$, in which p=p+1; updating $u_i^p$ by formula (36); performing Step 3;

$$u_i^p = \varphi_i u_i^{p,*} + (1-\varphi_i)u_i^{p-1} \quad (36)$$

where, $\varphi_i$ is a weight coefficient of the objective function of the $i^{th}$ node; and Step 5: issuing a control variable at an initial position of $u_i^p$ to the distributed new energy inverter, the energy storage inverter and the SVC inverter, where k=k+1; and performing Step 1.

7. The long-timescale voltage regulation method based on source-grid -load-storage multi-terminal collaboration of a power distribution network according to claim 3, further comprising:
allocating power regulation quantities to the source terminal, the load terminal, and the storage terminal according to the optimal power control sequence.

8. The long-timescale voltage regulation method based on source-grid -load-storage multi-terminal collaboration of a power distribution network according to claim 7, wherein the source terminal comprises: distributed new energy equipment; the load terminal comprises: static var compensators (SVCs); and the storage terminal comprises: energy storage equipment.

9. The long-timescale voltage regulation method based on source-grid -load-storage multi-terminal collaboration of a power distribution network according to claim 1, wherein the source terminal comprises: distributed new energy equipment; the load terminal comprises: static var compensators (SVCs); and the storage terminal comprises: energy storage equipment.

* * * * *